US011929800B2

(12) United States Patent
Lee et al.

(10) Patent No.: US 11,929,800 B2
(45) Date of Patent: Mar. 12, 2024

(54) METHOD AND APPARATUS FOR MULTI-STAGE UL PRECODING

(71) Applicant: Samsung Electronics Co., Ltd., Suwon-si (KR)

(72) Inventors: Gilwon Lee, McKinney, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/807,366

(22) Filed: Jun. 16, 2022

(65) Prior Publication Data

US 2023/0017254 A1    Jan. 19, 2023

Related U.S. Application Data

(60) Provisional application No. 63/218,144, filed on Jul. 2, 2021.

(51) Int. Cl.
*H04B 7/0456* (2017.01)

(52) U.S. Cl.
CPC .................. *H04B 7/0456* (2013.01)

(58) Field of Classification Search
CPC ...... H04B 7/06; H04B 7/0413; H04B 7/0456; H04L 5/00; H04L 25/02; H04L 25/03; H04W 8/24; H04W 52/42; H04W 72/04; H04W 72/06; H04W 76/27; H04W 88/02
USPC ................ 375/219, 260, 262, 267, 295, 316
See application file for complete search history.

(56) References Cited

U.S. PATENT DOCUMENTS

| | | | |
|---|---|---|---|
| 11,206,064 B2 * | 12/2021 | Ren | ................... H04W 72/0453 |
| 2019/0280751 A1 | 9/2019 | Tsai et al. | |
| 2020/0021343 A1 | 1/2020 | Liu | |
| 2020/0052747 A1 | 2/2020 | Onggosanusi et al. | |
| 2020/0177257 A1 | 6/2020 | Nammi et al. | |
| 2022/0386338 A1 * | 12/2022 | Li | ........................ H04B 7/0456 |

FOREIGN PATENT DOCUMENTS

WO    2021128289 A1    7/2021

OTHER PUBLICATIONS

International Search Report and Written Opinion dated Sep. 29, 2022 regarding International Application No. PCT/KR2022/009444, 7 pages.

(Continued)

*Primary Examiner* — Shawkat M Ali

(57) ABSTRACT

Apparatuses and methods for multi-stage UL precoding are provided. The method includes receiving configuration information about resource allocation for an uplink (UL) transmission, the configuration information indicating: allocated resources for an UL transmission, and UL precoding information for the UL transmission on the allocated resources, wherein the UL precoding information indicates: an update precoding matrix V, and basis vectors and coefficients for the update precoding matrix V; determining an UL precoding matrix for the UL transmission based on the update precoding matrix V and a previous UL precoding matrix; and performing UL transmission on the allocated resources using the UL precoding matrix.

20 Claims, 16 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321 V17.0.0, Mar. 2022, 146 pages.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331 V17.0.0, Mar. 2022, 1119 pages.

"3rd Generation Partnership Project; Technical Specification Group Radio Access Network; NR; Physical channels and modulation (Release 17)", 3GPP TS 38.211 V17.0.0, Dec. 2021, 134 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer procedures for control (Release 17)", 3GPP TS 38.213 V17.0.0, Dec. 2021, 225 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

"3rd Generation Partnership Project; Technical Specification Group Radio Access Network; NR; Physical layer measurements (Release 17)", 3GPP TS 38.215 V17.0.0, Dec. 2021, 26 pages.

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

* cited by examiner

METHOD AND APPARATUS FOR MULTI-STAGE UL PRECODING

CROSS-REFERENCE TO RELATED APPLICATIONS AND CLAIM OF PRIORITY

The present application claims priority to U.S. Provisional Patent Application No. 63/218,144, filed on Jul. 2, 2021. The content of the above-identified patent document is incorporated herein by reference.

TECHNICAL FIELD

The present disclosure relates generally to wireless communication systems and more specifically to multi-stage UL precoding.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses for multi-stage UL precoding.

In one embodiment, a UE in a wireless communication system is provided. The UE includes a transceiver configured to: receive configuration information about resource allocation for an uplink (UL) transmission, the configuration information indicating: allocated resources for the UL transmission, and UL precoding information for the UL transmission on the allocated resources, wherein the UL precoding information indicates: an update precoding matrix V, and basis vectors and coefficients for the update precoding matrix V. The UE further includes a processor configured, based on the update precoding matrix V and a previous UL precoding matrix, to determine an UL precoding matrix for the UL transmission. The transceiver is further configured to perform UL transmission on the allocated resources using the UL precoding matrix.

In another embodiment, a BS in a wireless communication system is provided. The BS includes a processor configured to: generate configuration information about resource allocation for a UL transmission, the configuration information indicating: allocated resources for the UL transmission, and UL precoding information for the UL transmission on the allocated resources, wherein the UL precoding information indicates: an update precoding matrix V, and basis vectors and coefficients for the update precoding matrix V. The BS further includes a transceiver operably coupled to the processor, the transceiver configured to: transmit the configuration information; and receive the UL transmission on the allocated resources using an UL precoding matrix, wherein the UL precoding matrix is based on the update precoding matrix V and a previous UL precoding matrix.

In yet another embodiment, a method for operating a UE is provided. The method comprises: receiving configuration information about resource allocation for an UL transmission, the configuration information indicating: allocated resources for the UL transmission, and UL precoding information for the UL transmission on the allocated resources, wherein the UL precoding information indicates: an update precoding matrix V, and basis vectors and coefficients for the update precoding matrix V; determining an UL precoding matrix for the UL transmission based on the update precoding matrix V and a previous UL precoding matrix; and performing UL transmission on the allocated resources using the UL precoding matrix.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
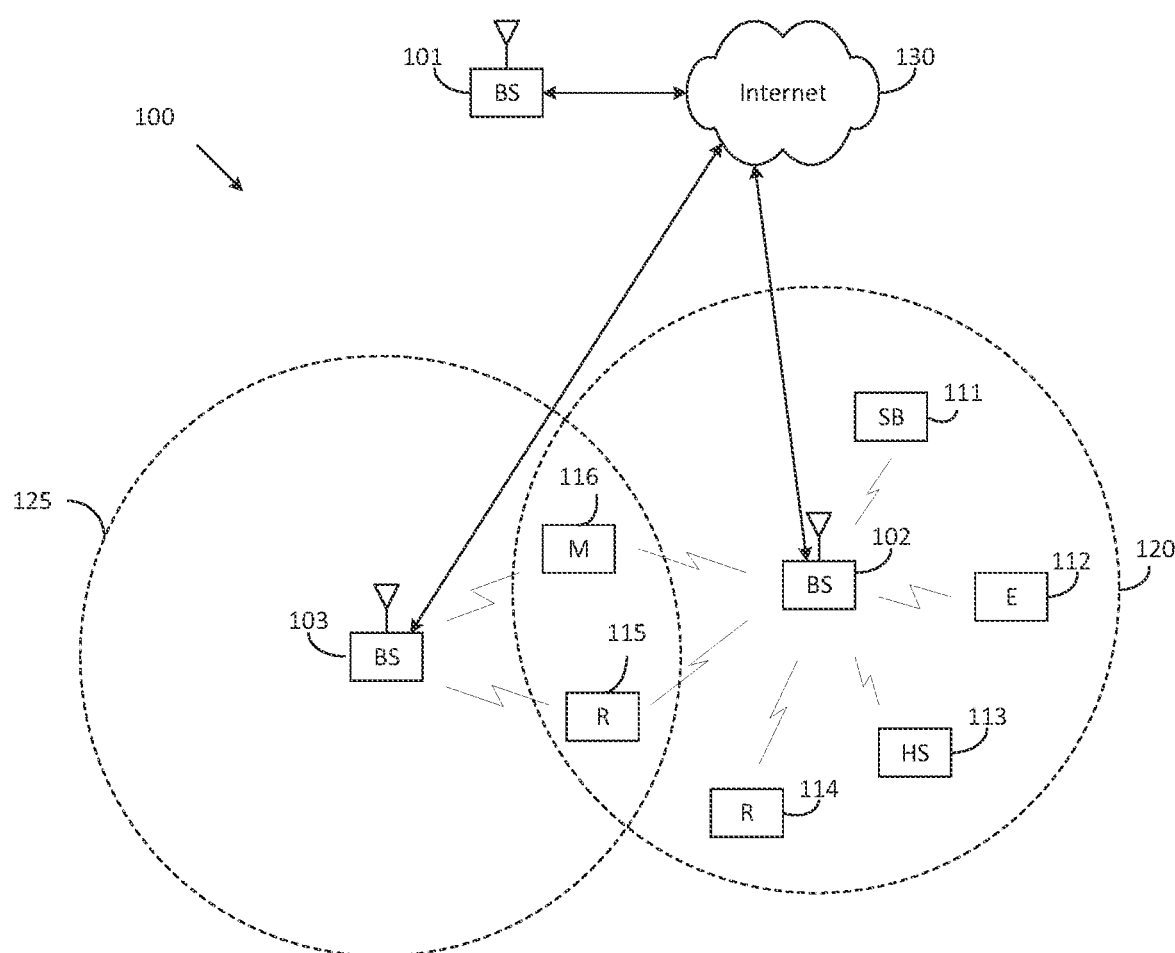
FIG. 1 illustrates an example wireless network according to embodiments of the present disclosure.

FIG. 1 through FIG. 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TS 38.211 v17.0.0, "NR, Physical channels and modulation" (herein "REF 6"); 3GPP TS 38.212 v17.0.0, "E-UTRA, NR, Multiplexing and channel coding" (herein "REF 7"); 3GPP TS 38.213 v17.0.0, "NR, Physical Layer Procedures for Control" (herein "REF 8"); 3GPP TS 38.214 v17.0.0; "NR, Physical Layer Procedures for Data" (herein "REF 9"); 3GPP TS 38.215 v17.0.0, "NR, Physical Layer Measurements" (herein "REF 10"); 3GPP TS 38.321 v17.0.0, "NR, Medium Access Control (MAC) protocol specification" (herein "REF 11"); 3GPP TS 38.331 v17.0.0, and "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Boosting uplink capacity becomes more important as various use cases that require transmitting high quality of sensor information at devices are coming in the near future as typical applications, such as industrial IoT applications including smart factory, mining, airport, autonomous devices exchanging sensor information, and other advanced devices supporting AR/VR.

Currently, several aspects on UL MIMO enhancement such as high-resolution precoding to boost uplink capacity have been considered as key candidate items of MIMO for the upcoming release (Rel-18). Those items are well defined in terms of issues among the companies but most of inventions related to high-resolution precoding have been developed under frameworks similar to the components of DL precoding (e.g., Type-II or eType-II CSI codebook), wherein significant indication overhead (e.g., PDCCH overhead) can be required. Thus, another breakthrough would be needed to overcome a bottleneck of indicating high-resolution UL precoding with low indication overhead.

In order to provide solutions on high-resolution UL precoding with low overhead, this disclosure introduces components for supporting multi-stage UL precoding mechanism, which can provide 1) more efficient signaling method to indicate UL precoding wherein the NW can exploit UL channel correlations across scheduling time instants (or SBs, etc.) and 2) multi-stage codebook methods wherein the NW can select a finer (potentially up to infinite) resolution of UL precoding.

Figure 2:
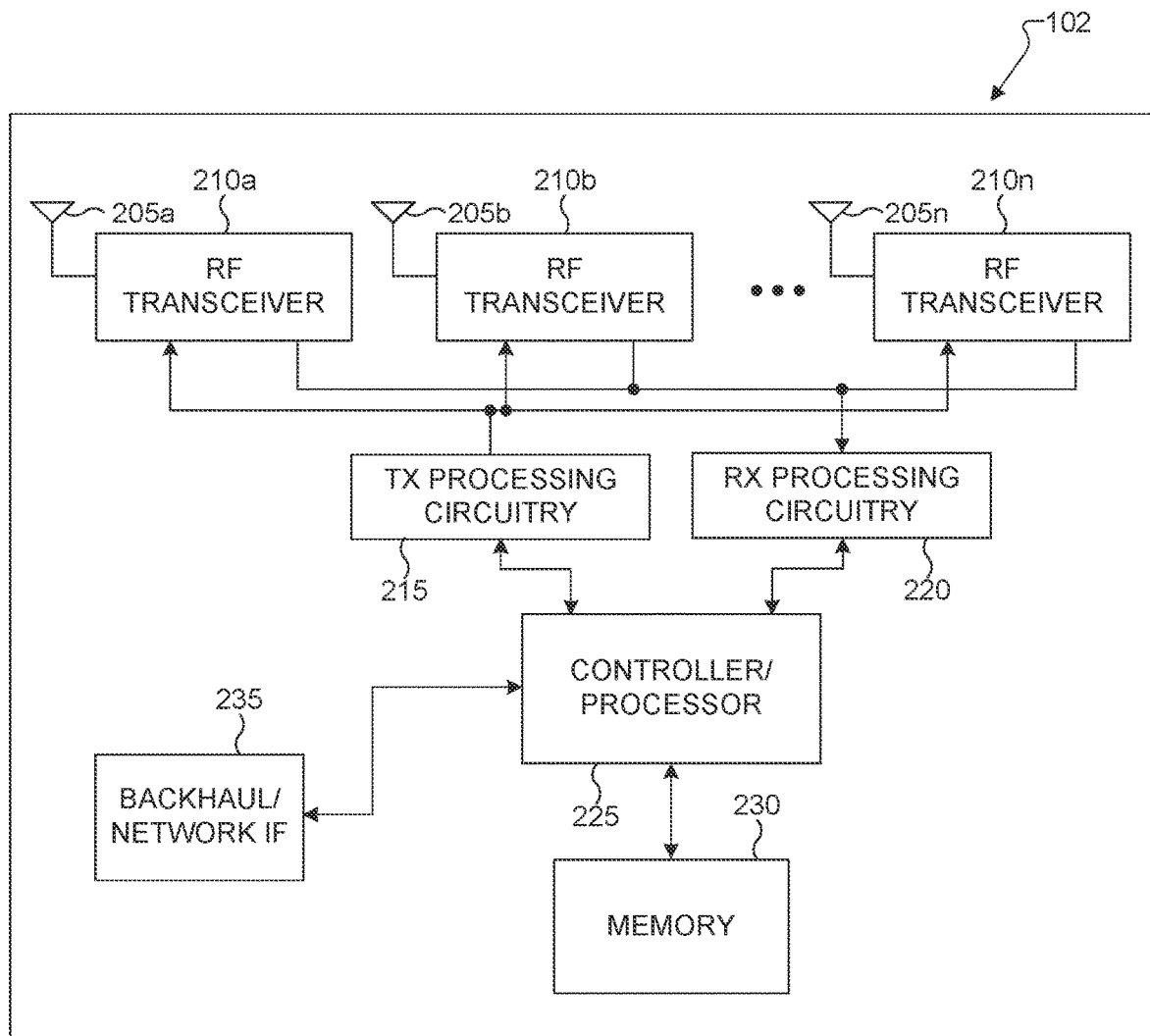
FIG. 2 illustrates an example gNB according to embodiments of the present disclosure.
Figure 3:
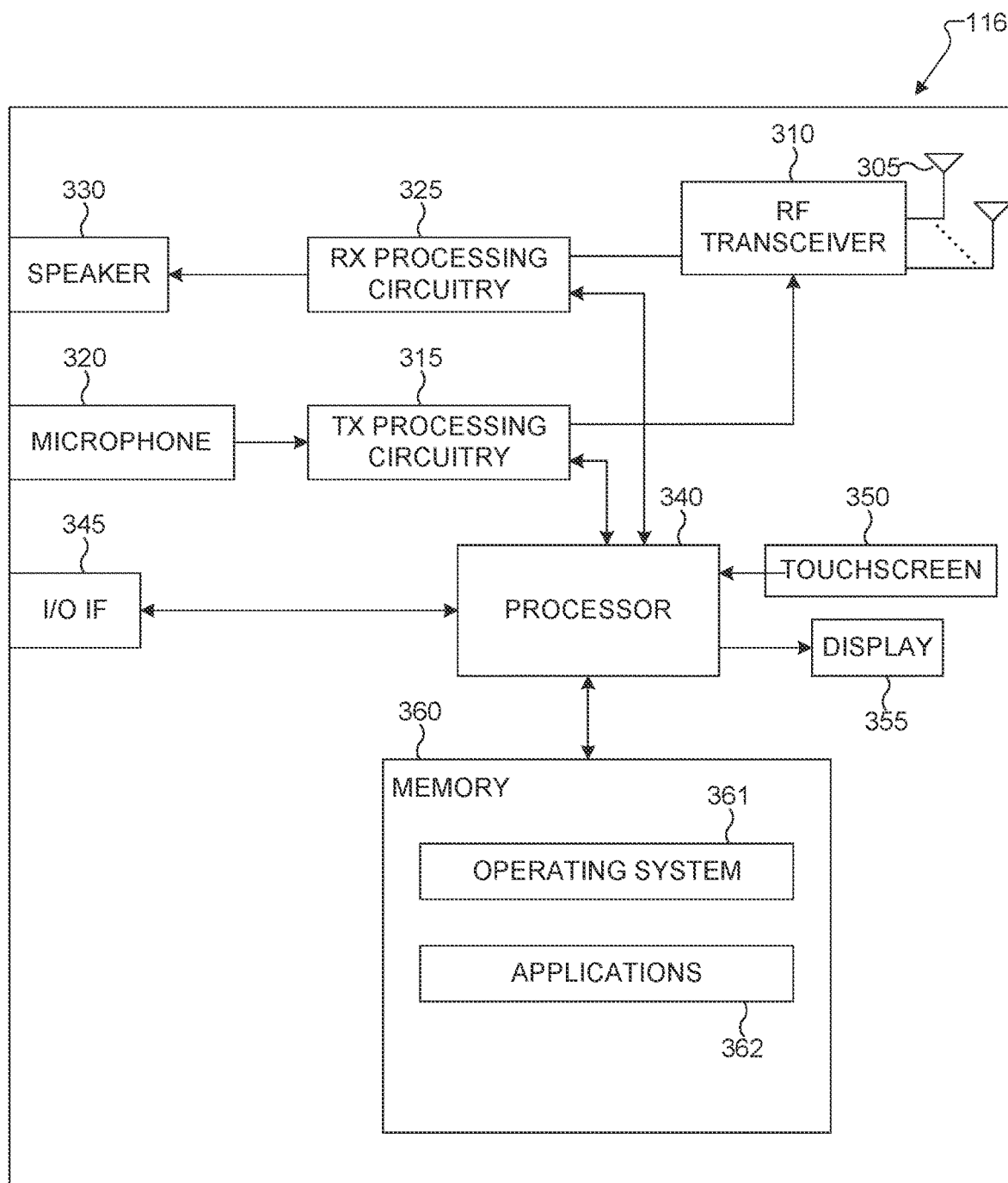
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information about resource allocation for an uplink (UL) transmission, the configuration information indicating: allocated resources for an UL transmission, and UL precoding information for the UL transmission on the allocated resources, wherein the UL precoding information indicates: an update precoding matrix V, and basis vectors and coefficients for the update precoding matrix V; determining an UL precoding matrix for the UL transmission based on the update precoding matrix V and a previous UL precoding matrix; and performing UL transmission on the allocated resources using the UL precoding matrix. One or more of the gNBs 101-103 includes circuitry, programing, or a combination thereof, for generating configuration information about resource allocation for an uplink (UL) transmission, the configuration information indicating: allocated resources for UL transmission, and UL precoding information for the UL transmission on the allocated resources, wherein the UL precoding information indicates: an update precoding matrix V, and basis vectors and coefficients for the update precoding matrix V; transmitting the configuration information; and receiving the UL transmission on the allocated resources using an UL precoding matrix, wherein the UL precoding matrix is based on the update precoding matrix V and a previous UL precoding matrix.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of DL channel signals and the transmission of UL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information about resource allocation for an uplink (UL) transmission, the configuration information indicating: allocated resources for an UL transmission, and UL precoding information for the UL transmission on the allocated resources, wherein the UL precoding information indicates: an update precoding matrix V, and basis vectors and coefficients for the update precoding matrix V; determining an UL precoding matrix for the UL transmission based on the update precoding matrix V and a previous UL precoding matrix; and performing UL transmission on the allocated resources using the UL precoding matrix. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
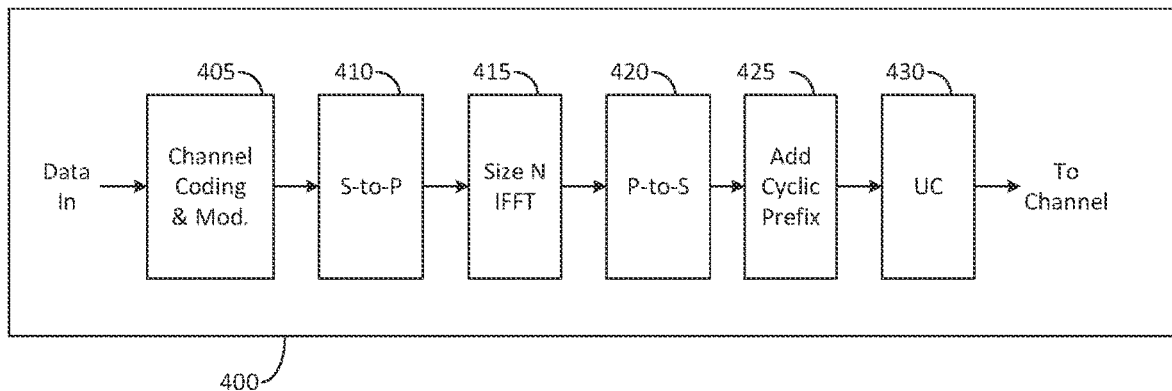
FIG. 4A illustrates a high-level diagram of an orthogonal frequency division multiple access transmit path according to embodiments of the present disclosure.
Figure 4B:
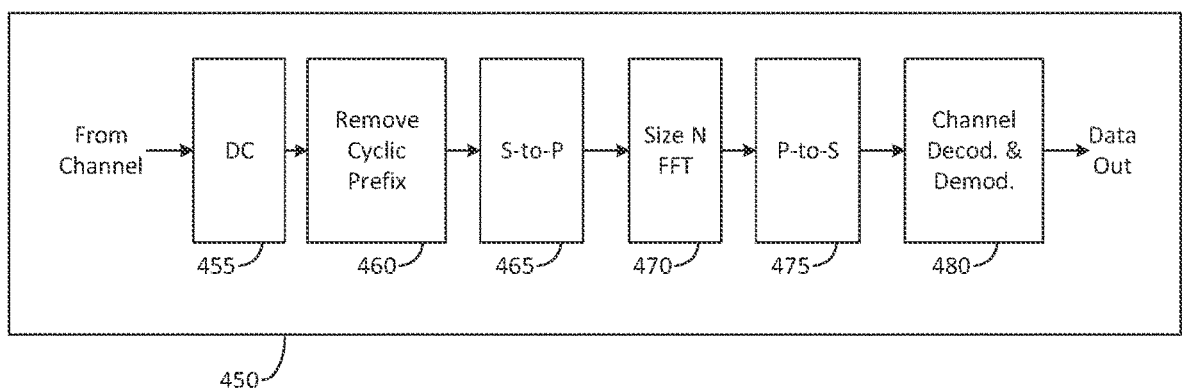
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes N EPDCCH sub-carriers, or resource elements (REs), such as 12 REs. A unit of one RB over one subframe is referred to as a PRB. A UE can be allocated $n_s=(n_{s0}+\gamma \cdot N_{EPDCCH})$ mod D RBs for a total of $Z=O_F+\lfloor n_{s0}+\gamma \cdot N_{EPDCCH})/D \rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{SC}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
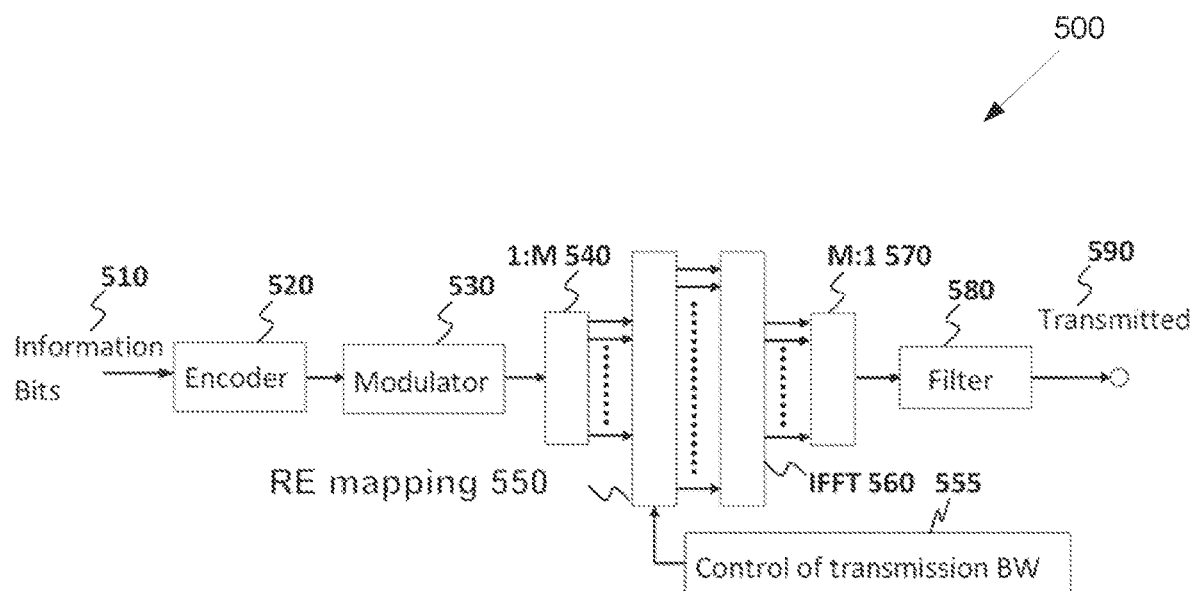
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
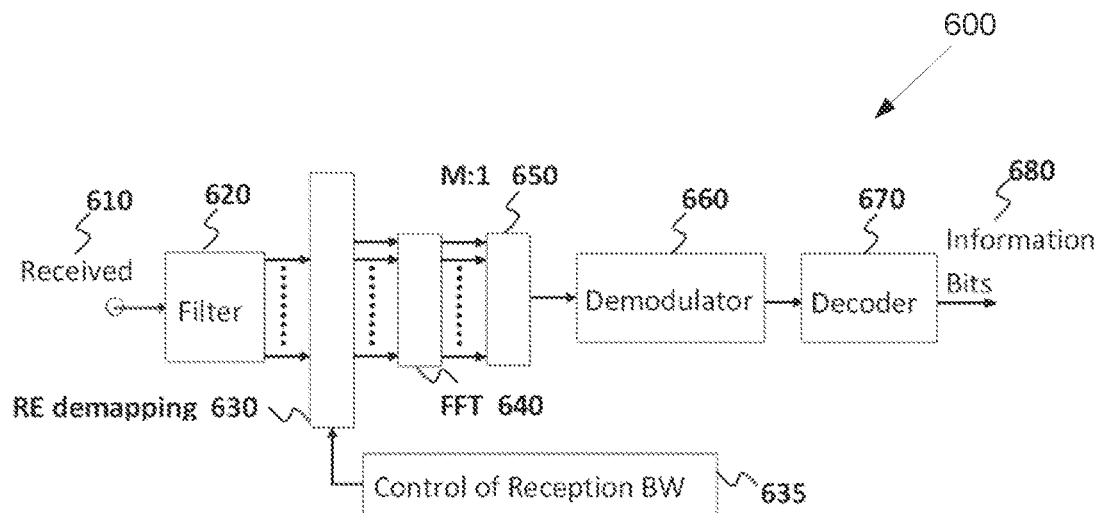
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
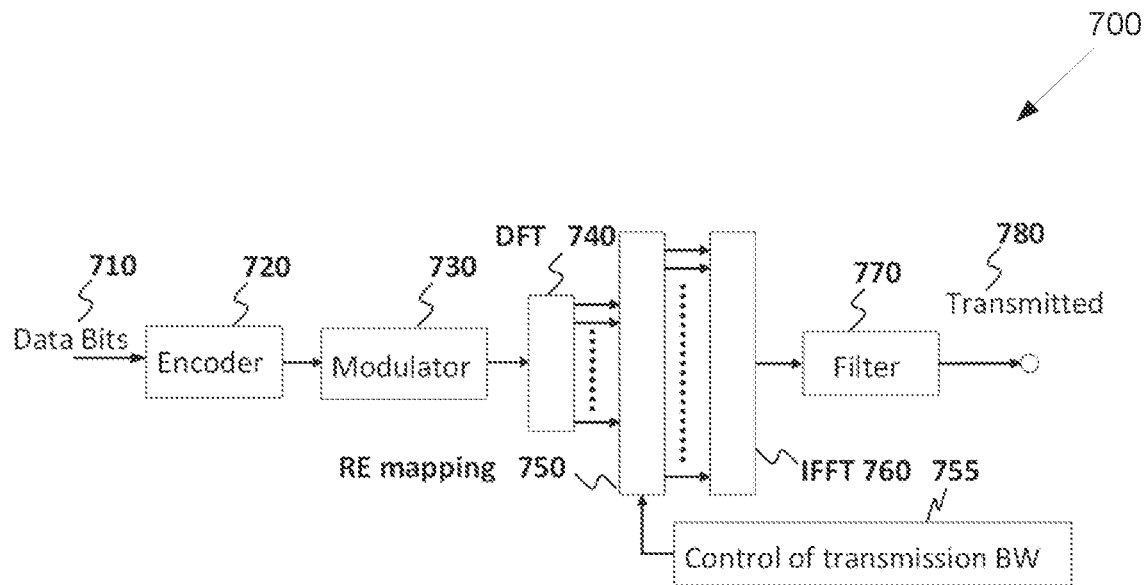
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
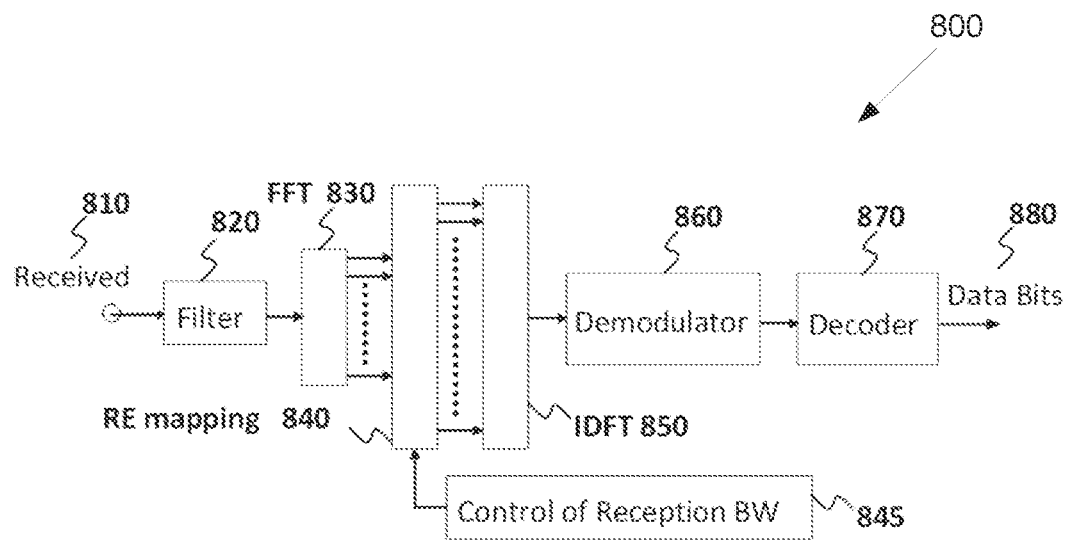
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies an FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
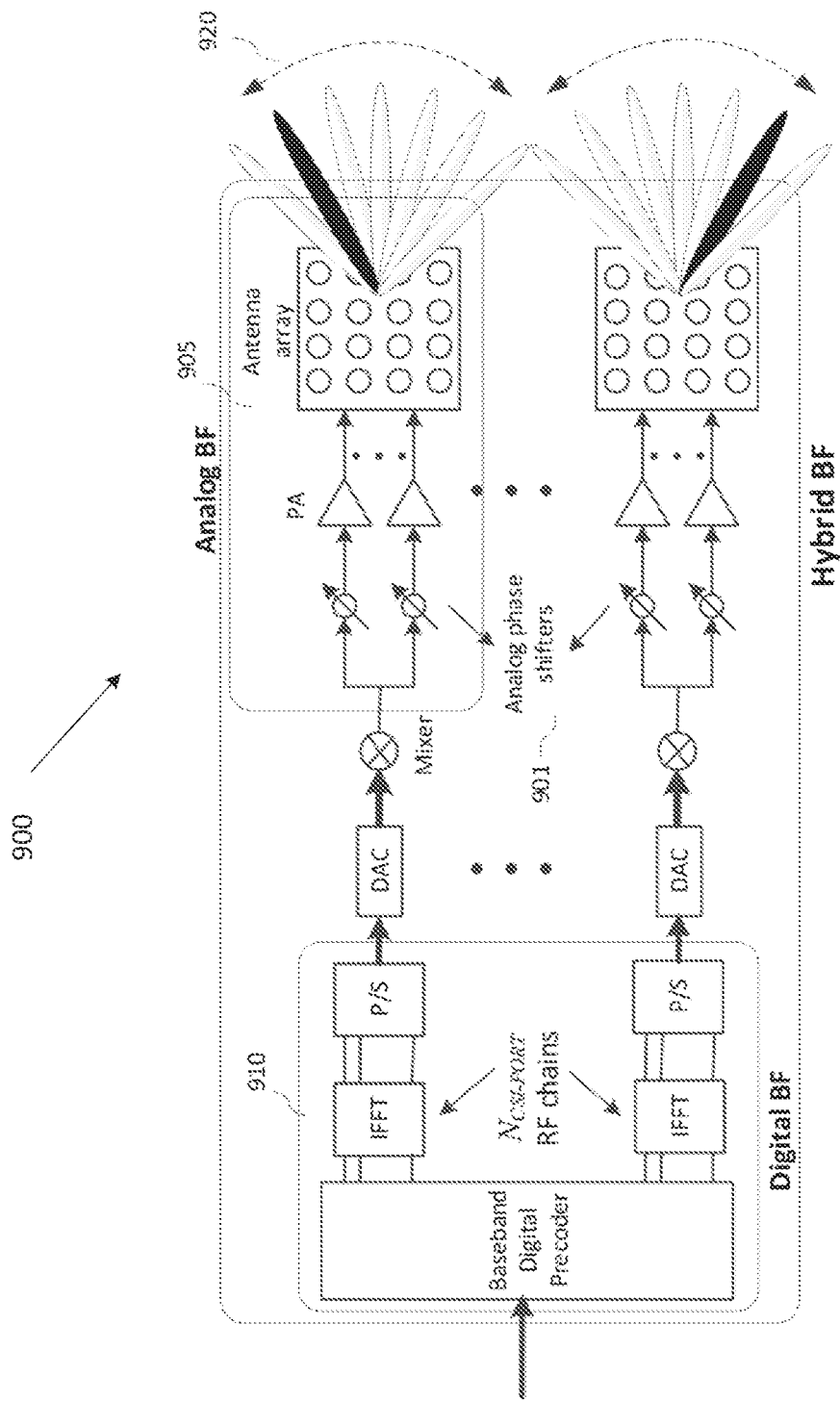
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

Rel.14 LTE and Rel.15 NR specifications support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI\text{-}PORT}$. A digital beamforming unit 910 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @ 100 m distance), larger number of and sharper analog beams (hence larger number of radiators in the array) will be needed to compensate for the additional path loss.

In the present disclosure, the frequency resolution (reporting granularity) and span (reporting bandwidth) of CSI or calibration coefficient reporting can be defined in terms of frequency "subbands" and "CSI reporting band" (CRB), respectively.

A subband for CSI or calibration coefficient reporting is defined as a set of contiguous PRBs which represents the smallest frequency unit for CSI or calibration coefficient reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI or calibration coefficient reporting setting.

"CSI reporting band" is defined as a set/collection of subbands, either contiguous or non-contiguous, wherein CSI or calibration coefficient reporting is performed. For example, CSI or calibration coefficient reporting band can include all the subbands within the DL system bandwidth. This can also be termed "full-band". Alternatively, CSI or calibration coefficient reporting band can include only a collection of subbands within the DL system bandwidth. This can also be termed "partial band".

The term "CSI reporting band" is used only as an example for representing a function. Other terms such as "CSI reporting subband set" or "CSI or calibration coefficient reporting bandwidth" can also be used.

In terms of UE configuration, a UE can be configured with at least one CSI or calibration coefficient reporting band. This configuration can be semi-static (via higher-layer signaling or RRC) or dynamic (via MAC CE or L1 DL control signaling). When configured with multiple (N) CSI or calibration coefficient reporting bands (e.g., via RRC signaling), a UE can report CSI associated with n≤N CSI reporting bands. For instance, >6 GHz, large system bandwidth may require multiple CSI or calibration coefficient reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with Mn subbands when one CSI parameter for all the Mn subbands within the CSI reporting band. A CSI parameter is configured with "subband" for the CSI reporting band with Mn subbands when one CSI parameter is reported for each of the Mn subbands within the CSI reporting band.

In NR, there are three types of UL resource allocation schemes, namely Type-0, Type-1, and Type-2. In UL resource allocation of Type 0, the resource block assignment information includes a bitmap indicating the Resource Block Groups (RBGs) that are allocated to the scheduled UE where a RBG is a set of consecutive resource blocks defined by higher layer parameter rbg-Size configured in pusch-Config and the size of the bandwidth part as defined in Table 1.

TABLE 1

| Bandwidth Part Size | Nominal RBG size P | |
|---|---|---|
| | Configuration 1 | Configuration 2 |
| 1-36 | 2 | 4 |
| 37-72 | 4 | 8 |
| 73-144 | 8 | 16 |
| 145-275 | 16 | 16 |

In uplink resource allocation of type 1, the resource block assignment information indicates to a scheduled UE a set of contiguously allocated non-interleaved resource blocks within the active bandwidth part of size $N_{BWP}^{size}$ PRBs except for the case when DCI format 0_0 is decoded in any common search space in which case the size of the initial UL bandwidth part $N_{BWP,0}^{size}$ shall be used.

An uplink type 1 resource allocation field consists of a resource indication value (RIV) corresponding to a starting virtual resource block ($RB_{start}$) and a length in terms of contiguously allocated resource blocks $L_{RBs}$.

For uplink type 2 resource allocation, please refer to [9] in detail.

In NR, TPMI is indicated to UE through DCI scheduling uplink transmission or high layer parameters, and the UL precoding corresponding to the indicated TPMI is applied for the scheduled UL transmission. In the current UL TPMI framework, the UE has to be indicated on UL precoding (by TPMI) for every codebook-based UL transmission, which is selected from a confined set of UL precoding matrices.

The current UL TPMI framework has two potential limitations: 1) it does not exploit any correlation that can exist in UL channels across scheduling time instants, and 2) it provides only a set of coarse UL precoding matrices which results in performance degradation in UL transmission.

This disclosure introduces components to support multi-stage UL precoding, which can overcome the two limitations of the current TPMI framework, by providing embodiments on adaptive/multi-stage UL precoding mechanism (and relevant sub-embodiments) wherein UL precoding to be used at a current scheduling time instant is generated based on the UL precoding used at the previous scheduling time instant and an update matrix (vector) which is selected from adaptive/multi-stage UL precoding codebook and indicated by the NW via DCI/MAC-CE/higher parameter. In addition, this disclosure provides several adaptive/multi-stage codebook mechanisms wherein elements of update matrix are selected from adaptive/multi-stage resolutions of codebooks that can be updated via the NW's control signaling (e.g., DCI).

Figure 10:
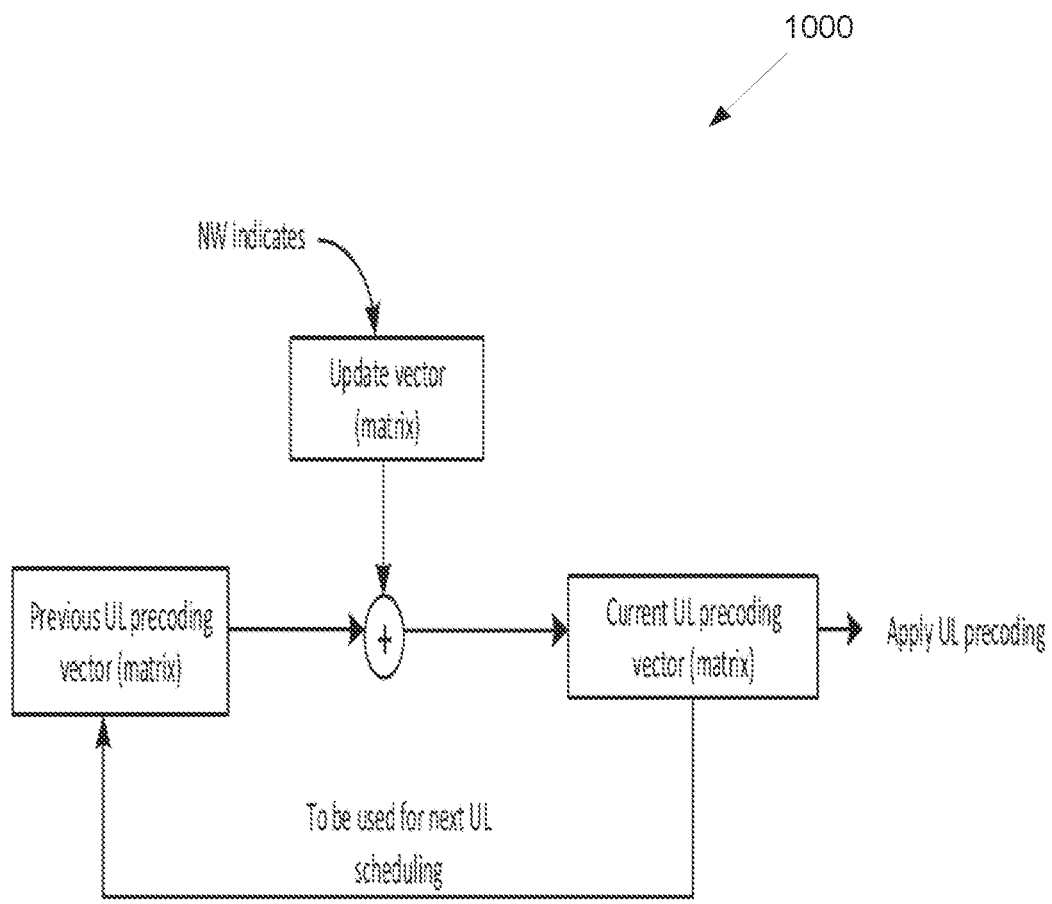
FIG. 10 illustrates an example of adaptive/multi-stage UL precoding according to embodiments of the present disclosure.

FIG. 10 illustrates an example of adaptive/multi-stage UL precoding 1000 according to embodiments of the present disclosure. The embodiment of the adaptive/multi-stage UL precoding 1000 illustrated in FIG. 10 is for illustration only. FIG. 10 does not limit the scope of this disclosure to any particular implementation.

In one embodiment, a UE is configured/indicated via DCI/MAC-CE or higher layer parameter to apply for UL precoding based on adaptive filter or differential or multi-stage techniques wherein, for example, the current UL precoding vector (matrix) is determined using a first UL precoding vector (matrix) and a second UL precoding vector (matrix), namely $P_1$ and $P_2$, respectively. In one example, $P_1$ is a previous UL precoding vector (matrix) and $P_2$ is an update vector (matrix), as shown in FIG. 10.

In an adaptive/multi-stage UL precoding framework as shown in FIG. 5, the NW and the UE track a history of previous UL precoding matrices and the UE computes a UL precoding matrix(s) by adding a previous UL precoding matrix(s) to an update matrix(s) if the update matrix is indicated by the NW via DCI/MAC-CE/higher-layer parameter.

In one example, $P_1$ and $P_2$ can be determined/configured according to at least one of the following examples:

In one example, $P_1$ and $P_2$ respectively are a reference (base) UL precoding vector (matrix) and a differential UL precoding vector (matrix). In this case, the final UL precoding vector (matrix) can be given by $P=\beta(P_1+\gamma P_2)$ where $\gamma$ is a scaling factor, e.g., $\gamma=1$, and $\beta$ is a normalization factor, e.g., the value of $\beta$ is such that columns of P has norm $$\frac{1}{\sqrt{v}}$$

where v=rank value or number of columns of P, or the value of β=number of non-zero elements (entries) of P.

In one example, $P_1$ and $P_2$ respectively are wideband (WB) and subband (SB) components of the UL precoding vector (matrix).

In one example, $P_1$ and $P_2$ respectively are long-term (slowly varying) and short-term (fast varying) components of the UL precoding vector (matrix).

In one example, $P_1$ and $P_2$ respectively are semi-statically (e.g., via RRC) and dynamically (e.g., MAC CE or DCI) indicated/configured components of the UL precoding vector (matrix).

In one example, $P_1$ and $P_2$ respectively correspond to (or are based on) a combination of at least two of the above examples.

In one embodiment, more than two matrices (vectors), namely $\{P_j\}_{j=1}^J$, are determined/configured via DCI/MAC-CE or higher layer parameter for the UE to apply for UL precoding based on adaptive filter or differential or multi-stage techniques.

In one example, some of $P_j$s is/are reference UL precoding matrices and the other $P_j$s is/are differential UL precoding matrices. In one example, $P_j$ is a reference (base) UL precoding matrix and $P_j$ is a j-th differential UL precoding matrix for j=2, ..., J. In this case, the final UL precoding matrix can be given by $P=\eta(P_1+\Sigma_{j=2}^J \gamma_j P_j)$ where $\gamma_j$ is a scaling factor, e.g., $\gamma_j=1$, and $\eta$ is a normalization factor, e.g., the value of $\eta$ is such that columns of P has norm $$\frac{1}{\sqrt{v}}$$

where v=rank value or number of columns of P, or the value of η=number of non-zero elements (entries) of P. In one example, $\gamma_j$ can be independently chosen for each j.

In one example, some of $P_j$s is/are WB components of the UL precoding matrix and the other $P_j$s is/are SB components of the UL precoding matrix. In one example, $P_1$ is a WB component of the UL precoding matrix, $P_j$ is a subband (SB) component of the UL precoding matrix for j=2, ..., J. In this case, j corresponds to SB index, and the UL precoding matrix for j-th SB can be given by $P^{(j)}=\eta(P_1+\gamma_j P_j)$.

In one example, some of $P_j$ s is/are long-term (slowly varying) components of UL precoding matrix and the other $P_j$s is/are short-term (fast varying) components of UL precoding matrix.

In one example, some of $P_j$s is/are semi-statistically (e.g., via RRC) indicated/configured components of the UL precoding matrix, and the other $P_j$s is/are dynamically (e.g., MAC CE or DCI) indicated/configured components of the UL precoding vector (matrix). In one example, for the case of J=3, $P_1$, $P_2$, and $P_3$ are components of the UL precoding matrix indicated/configured via RRC, MAC-CE, and DCI, respectively.

In one example, $P_j$s respectively corresponds to a combination of at least two of the above examples.

In one embodiment, all embodiments/sub-embodiments/examples provided in this disclosure can be applicable to CSI codebooks/mechanisms for reporting DL channels. Compared to UL cases, in DL cases, a UE is configured to report DL channels (precoding matrix) using adaptive filter or differential or multi-stage techniques.

In the rest of the disclosure, embodiments are described using the term 'adaptive'. The disclosure however applies to similar concepts which require multiple steps to obtain the final precoder such as differential, multi-stage, multi-resolution, etc.

In the rest of the disclosure, embodiments are described using two matrix components (i.e., two-stage case of $P_1$ and $P_2$), but the disclosure applies/extends multi-stage cases where $\{P_j\}_{j=1}^J$ matrix components are indicated/configured based on adaptive filter or differential or multi-stage techniques.

Figure 11:
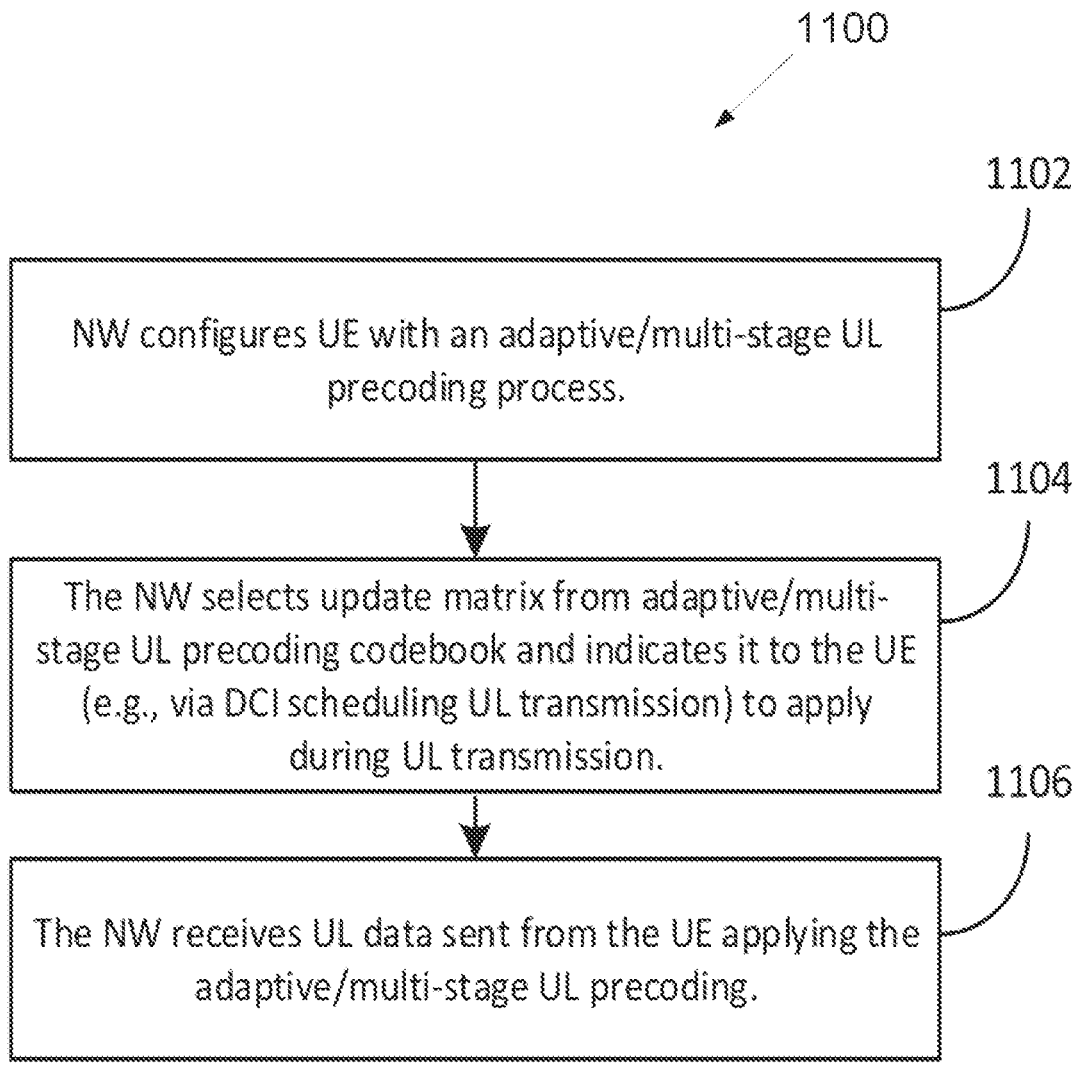
FIG. 11 illustrates a flow diagram of NW operations for adaptive/multi-stage UL precoding according to embodiments of the present disclosure.

FIG. 11 illustrates a flow diagram of NW operations for adaptive/multi-stage UL precoding 1100 according to embodiments of the present disclosure. The embodiment of the flow diagram of NW operations for adaptive/multi-stage UL precoding 1100 illustrated in FIG. 11 is for illustration only. FIG. 11 does not limit the scope of this disclosure to any particular implementation.

At operation 1102, the NW configures the UE with one (or more) adaptive/multi-stage UL precoding process. In one example, the overall process of adaptive/multi-stage UL precoding follows the framework shown in FIG. 10. At operation 1104, the NW selects an update matrix from an adaptive/multi-stage UL precoding codebook and indicate the update matrix to the UE. Embodiments regarding the operation 1104 will be described. At operation 1106, the NW receives UL data sent from the UE applying the adaptive/multi-stage UL precoding.

Figure 12:
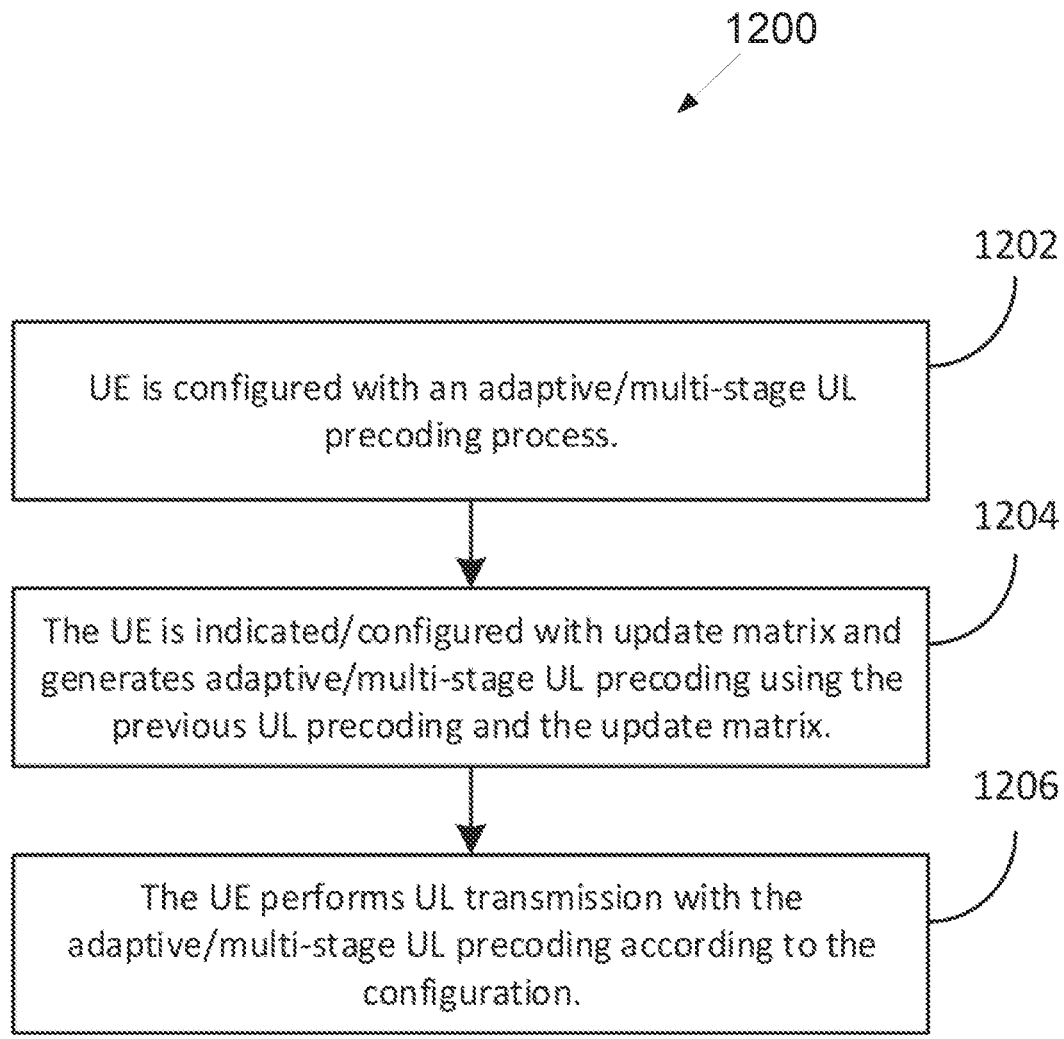
FIG. 12 illustrates a flow diagram of UE operations for adaptive/multi-stage UL precoding according to embodiments of the present disclosure.

FIG. 12 illustrates a flow diagram of UE operations for adaptive/multi-stage UL precoding 1200 according to embodiments of the present disclosure. The embodiment of the flow diagram of UE operations for adaptive/multi-stage UL precoding 1200 illustrated in FIG. 12 is for illustration only. FIG. 12 does not limit the scope of this disclosure to any particular implementation.

At operation 1202, the UE is configured with one (or more) adaptive/multi-stage UL precoding process. In one example, the overall process of adaptive/multi-stage UL precoding follows the framework shown in FIG. 10. At operation 1204, the UE is indicated/configured with an update matrix and generates adaptive/multi-stage UL precoding using the previous UL precoding and the update matrix. Embodiments regarding the operation 1204 will be described. At operation 1206, the UE performs UL transmission with the adaptive/multi-stage UL precoding according to the configuration.

Figure 13:
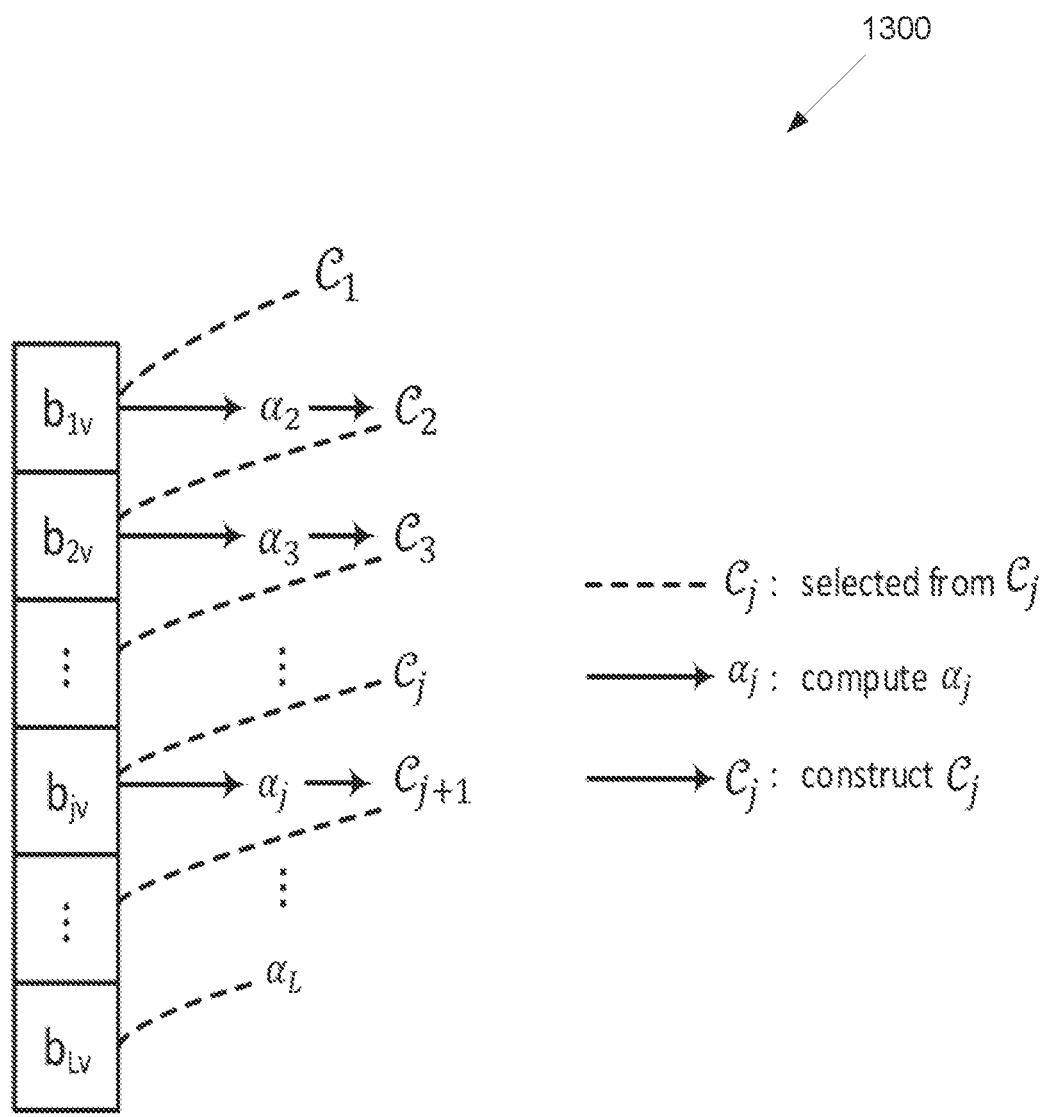
FIG. 13 illustrates a visual interpretation of an adaptive codebook mechanism using the unit-norm property for a column of B according to embodiments of the present disclosure.

FIG. 13 illustrates a visual interpretation on an adaptive codebook mechanism using the unit-norm property for a column of B 1300 according to embodiments of the present disclosure. The embodiment of the adaptive codebook mechanism using the unit-norm property for a column of B 1300 illustrated in FIG. 13 is for illustration only. FIG. 13 does not limit the scope of this disclosure to any particular implementation.

In one embodiment, UL precoding vector/matrix is updated as follow:

$$V_{WB,i}=V_{WB,i-1}+\Delta V_{WB,i} \quad (1)$$

where $V_{WB,i}$, $V_{WB,i-1}$, and $\Delta V_{WB,i}$ are current UL precoding matrix, previous UL precoding matrix, and update matrix, respectively. Here, $V_{WB,i}$ and $\Delta V_{WB,i}$ are N×R matrices, where N and R are the number of antenna ports at the UE and the number of layers (streams), respectively. Here, i refers to an index at an adaptive/multi-stage UL precoding process.

In one example, $N=aN_1N_2$, where $N_1$ and $N_2$ respectively are numbers of antenna ports in first and second dimensions, respectively, and α=1 when the antenna ports are co-polarized (or single polarized), and α=2 when the antenna ports are dual-polarized.

In one example, the set of candidate values for N include {2,4} or {4} or {4,8} or {2,4,8} or {8} or {2,4,8,16} or {4,8,16}.

In one embodiment, for 2 or 4 antenna ports (N=2 or 4), a codebook for base (or initial) UL precoding is the same as the current TPMI codebook in Rel-15/16. Here, the base UL precoding refers to the first UL precoding (i.e., $V_{WB,0}$) in an adaptive/multi-stage UL precoding technique before starting the update process in (1).

In one example, the base UL precoding is selected from a high-resolution codebook.

In one example, the base UL precoding is fixed. For example, $V_{WB,0}=I_{N,R}$, where $I_{N,R}$ is the matrix composed of the first R columns of the N×N identity matrix.

In one example, the base UL precoding is selected from the same codebook for $\Delta V_{WB,i}$, which will be provided in embodiment I.1. That is, the codebook for $V_{WB,0}$ is the same as that for $\Delta V_{WB,i}$.

In one embodiment, adaptive/multi-stage UL precoding is configured (e.g., via DCI) in an aperiodic manner. With the DCI indication, the UE can apply UL precoding based on the previous UL precoding and an update matrix that can be indicated together with the DCI indication. In another example, a subsequent DCI scheduling UL transmission contains an update matrix for the UE to apply for the adaptive/multi-stage UL precoding. For the next scheduling time instant, the UE does not expect to apply for adaptive/multi-stage UL precoding unless another DCI indication for adaptive/multi-stage UL precoding is received/configured.

In one embodiment, adaptive/multi-stage UL precoding is configured (e.g., via DCI/MAC-CE/higher parameter) in a semi-persistent manner. Activation/deactivation for adaptive/multi-stage UL precoding can be performed via DCI/MAC-CE/RRC parameter(s). Once the activation is received/configured, the UE expects to apply for adaptive/multi-stage UL precoding in subsequent scheduling time instants until the deactivation is received/configured. In one example, the NW can indicate a temporal fallback mode, e.g., retrieving the original UL precoding mechanism for a while (or for the corresponding time instant only), during the activation period. In this case, the NW follows the original UL precoding mechanism (including the codebook) and the UE also disregards the adaptive/multi-stage UL precoding mechanism and uses the original UL precoding codebook to apply for the UL precoding.

In one embodiment, adaptive/multi-stage UL precoding is configured (e.g., via DCI/MAC-CE/higher parameter) in a periodic manner. Once the periodic adaptive/multi-stage UL precoding is configured, the UE keeps adapting its UL precoding for every periodic update. In one example, the NW can indicate a temporal fallback mode, e.g., retrieving the original UL precoding mechanism for a while (or for the corresponding time instant only), during that the periodic adaptive/multi-stage UL precoding is performed. In this case, the NW follows the original UL precoding mechanism (including the codebook) and the UE also disregards the adaptive/multi-stage UL precoding mechanism and uses the original UL precoding codebook to apply for the UL precoding.

In one embodiment, a parameter to count time instant (e.g., an index i in (1)) for an adaptive/multi-stage UL precoding process is configured via DCI/MAC-CE/RRC parameter. In one example, the parameter is counted when adaptive/multi-stage UL precoding is indicated/updated by the NW, e.g., via a DCI scheduling UL transmission and/or indicating adaptive/multi-stage UL precoding. In another example, the parameter is counted after the UE figures out that the NW successfully decodes UL transmission (PUSCH/PUCCH), e.g., if the NW does not send retransmission request for a certain period of time. In one example, the parameter is configured to report to the NW, dynamically/semi-persistently/periodically. In another example, the parameter is indicated to the UE at some adaptive/multi-stage UL process instants (or every instant), and if the UE has different understanding with indicated parameter value, the UE reports to the NW that there is misunderstanding on the parameter, using for example an indicator parameter.

In one embodiment, some rules are pre-determined to prevent from error propagation due to differential codebook scheme. In one example, some rules are as follows:
1. When the UE successfully decodes UL-related DCI scheduling UL resources and containing update matrix information and performs UL transmission, the UE does not complete updating UL precoding matrix (e.g., performing (1)) for a certain time duration,
2. If the NW does not detect the (previously) scheduled PUSCH transmission based on adaptive/multi-stage UL precoding process, the NW sends UL-related DCI again with an indicator of retransmission request within the time duration.
3. If the NW fails to receive PUSCH X times (e.g., X=2), the NW should use the base codebook (or the original codebook) (not differential codebook) at least in the next UL grant.

In one embodiment, the update matrix ($\Delta V_{WB,i}$) is selected from the following LC codebook:

$$\Delta V_{WB,i} = WB \quad (2)$$

where W and B are N×L(≤N) basis matrix and L×R coefficient matrix, respectively. Here, L is the number of basis vectors. In one example, L=N, i.e., full space is used.

In one embodiment, the basis matrix W is selected from a set of oversampled DFT vectors and indicated to the UE. In one example, for a given N and oversampled factor $O_1$, a DFT vector $W_\ell$ can be expressed as $$w_\ell = \frac{1}{\sqrt{N}} \begin{bmatrix} 1 & e^{j\frac{2\pi\ell}{O_1 N}} & \cdots & e^{j\frac{2\pi\ell(N-1)}{O_1 N}} \end{bmatrix}^T,$$

where $\ell \in \{0, 1, \ldots, O_1 N-1\}$. In one example, $O_1=1$. In one example, $O_1>1$ and the value is either fixed (e.g., to 4) or configured (e.g., via RRC).

In one example, W=I, an identity matrix, i.e., there is no basis matrix in the codebook. In this case, (2) is reduced to $\Delta V_{WB,i}=B$.

In one example, W=$W_{DFT}$, a DFT matrix, i.e., a DFT matrix is fixed and used in the codebook. In this case, (2) is reduced to $\Delta V_{WB,i}=W_{DFT}B$.

In one example, W is dynamically/semi-persistently/periodically indicated via DCI/MAC-CE/RRC parameters.

In one example, W is selected/indicated independently for each layer (stream), i.e., $\Delta V_{WB,i}$ can be expressed as:

$$\Delta V_{WB,i} = \begin{bmatrix} W_1 & \cdots & W_R \end{bmatrix} \begin{bmatrix} b_1 & 0 & 0 \\ 0 & \ddots & 0 \\ 0 & 0 & b_R \end{bmatrix},$$

where $W_v$ and $b_v$ are the basis matrix for layer v and the v-th column vector of B, respectively.

In one embodiment, the elements of B are decomposed into phases and amplitudes (or powers), and they are selected from respective codebooks. In one example, the phase codebook is fixed, e.g., QPSK or 8PSK or 16PSK. In one example, the phase codebook is configured (via e.g., RRC), e.g., from QPSK (2-bit), 8PSK (3-bit per phase) and 16PSK (4-bit per phase). In one example, amplitudes are selected from an n-bit codebook having $2^n$ equidistant points in [0, X] in dB scale, e.g., X=1. In another example, the amplitude codebook is configured (via e.g., RRC), e.g., from 2-bit, 3-bit, and 4-bit codebooks having equidistant points in [0, X] in dB scale (e.g., 1.5 dB, 3 dB, 6 dB etc.). An example of 3-bit amplitude codebook having equidistant points in [0,1] in 3 dB scale is shown as follows:

3-Bit Amplitude Codebook

| Index | Amplitude |
|---|---|
| 0 | 1 |
| 1 | $\frac{1}{8}$ |
| 2 | $\frac{1}{4\sqrt{2}}$ |
| 3 | $\frac{1}{4}$ |
| 4 | $\frac{1}{2\sqrt{2}}$ |
| 5 | $\frac{1}{2}$ |
| 6 | $\frac{1}{\sqrt{2}}$ |
| 7 | 1 |

In one example, an adaptive codebook mechanism considering the unit-norm property for each column of B is used to indicate amplitudes for each column of B (i.e., each layer). In one example, an adaptive codebook mechanism is defined as follows:

Define a base codebook $\mathcal{C}_1$. For example, the n-bit codebook having $2^n$ equidistant points in [0, X] in dB scale is $\mathcal{C}_1$, where, for example, X=1.

For each j=2, 3, . . . , L, define an adaptive codebook $\mathcal{C}_1$ that is determined by the base codebook $\mathcal{C}_1$ and parameter $\alpha_1$, where L is the number of rows of B. For example, $\mathcal{C}_1=\{\alpha_j \times c_n | c_n$ is in $\mathcal{C}_1$ and $0 \leq \alpha_j \leq 1\}$. Note that in this example the elements in $\mathcal{C}_1$ are scaled down by $\alpha_j$ from the elements of $\mathcal{C}_1$.

$\alpha_1$ is determined in a pre-defined rule. Several examples will be provided in subsequent examples.

In one example, for each j-th row entry of a given column v of B, denoted by $b_{jv}$, it is selected from codebook $\mathcal{C}_1$, where $$\alpha_j = \sqrt{1 - \Sigma_{k=1}^{j-1} |b_{kv}|^2}. \quad (3)$$

Here, $b_{jv}$ is selected in the order of row index j and $\alpha_j$ is also computed in the order of row index j. That is, $b_{1v}$ is first selected from the base codebook $\mathcal{C}_1$, and then $\alpha_2$ is computed using (3) to construct $\mathcal{C}_2$, and then $b_{2v}$ is selected from $\mathcal{C}_2$, and then $\alpha_3$ is computed, . . . and so on. Note that (3) enables codebooks to adaptively increase the resolution of elements while making sure the norm of the given column to be less than or equal to one (the unit-norm property). Optionally, the last element (i.e., L-th row) is regarded as $\alpha_L = \sqrt{1 - \Sigma_{k=1}^{L-1} |b_{kv}|^2}$, and thus no indication for the last element is needed. A visual description on an adaptive codebook mechanism using the unit-norm property for a column of B is depicted in FIG. 13.

Figure 14:
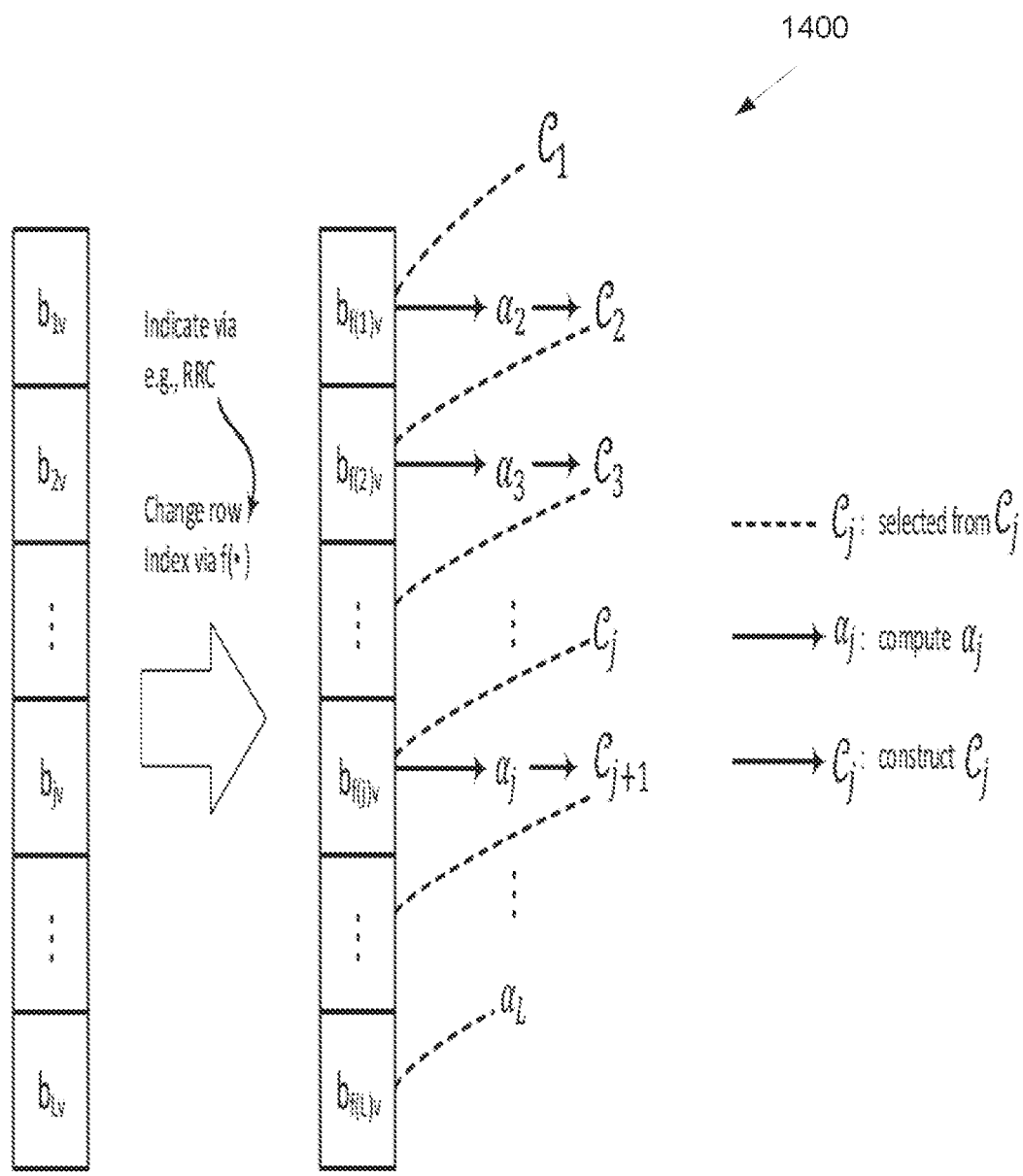
FIG. 14 illustrates a visual interpretation of an adaptive codebook mechanism using the unit-norm property for a column of B according to embodiments of the present disclosure.

FIG. 14 illustrates a visual interpretation on an adaptive codebook mechanism using the unit-norm property for a column of B 1400 according to embodiments of the present disclosure. The embodiment of the adaptive codebook mechanism using the unit-norm property for a column of B 1400 illustrated in FIG. 14 is for illustration only. FIG. 14 does not limit the scope of this disclosure to any particular implementation.

In one example, the selecting order on row index is configured e.g., via RRC/MAC-CE/DCI. For example, $b_{f(j)v}$ is selected from $\mathcal{C}_1$, where f(j) is a one-to-one mapping from {1, 2, . . . , L} to {1, 2, . . . , L}, and $$\alpha_j = \sqrt{1 - \Sigma_{k=1}^{j-1} |b_{f(k)v}|^2}, \quad (4)$$

and information on f(·) is indicated/configured via RRC/MAC-CE/DCI. Here, $b_{f(1)v}$ is first selected from the base codebook $\mathcal{C}_1$, and then $\alpha_2$ is computed using (4) to construct $\mathcal{C}_2$, and then $b_{f(2)v}$ is selected from $\mathcal{C}_2$, and then $\alpha_3$ is computed, . . . and so on. Note that (4) enables codebooks to adaptively increase the resolution of elements while making sure the norm of the given column to be less than or equal to one (the unit-norm property). Optionally, the last element (i.e., L-th row) is regarded as $\alpha_L = \sqrt{1 - \Sigma_{k=1}^{L-1} |b_{f(k)v}|^2}$, and thus no indication for the last element is needed. A visual description on an adaptive codebook mechanism using the unit-norm property for a column of B after shuffling row index for the column using f(·) is depicted in FIG. 14.

In one example, f(·) is configured for each column of B. In another example, f(·) is configured for one or multiple columns of B.

In one example, an adaptive codebook mechanism is designed in the same ways above, except that $\mathcal{C}_1$ is constructed as follows:

$$\mathcal{C}_j = \{c_n \leq \alpha_j | c_n \text{ is in } \mathcal{C}_1 \text{ and } 0 \leq \alpha_j \leq 1\} \text{ for } j=2,3 \ldots, L.$$

That is, $\mathcal{C}_1$ contains only the elements of $\mathcal{C}_1$ that are less than or equal to $\alpha_j$. The design mechanism makes the codebooks { $\mathcal{C}_1$ } to have the same resolution of $\mathcal{C}_1$ but to adaptively reduce their cardinality considering the unit-norm property, thereby reducing the indication overhead.

In one example, an adaptive/multi-stage codebook mechanism is used to indicate amplitudes of B, and the adaptive/multi-stage codebook mechanism is defined as follows:

The codebook $\mathcal{C}$ (t) to be used at the current scheduling time instant is updated based on the codebook $\mathcal{C}$ (t−1) used at the previous scheduling time instant. In one example, $\mathcal{C}(t)=\{\beta \times c_n | c_n \text{ is in } \mathcal{C}(t-1)\}$, where $\beta$ is a positive value. In one example, $\beta$ is pre-determined, e.g., $$\beta = \frac{1}{\sqrt{2}}.$$

In another example, $\beta$ is configured.

Figure 15:
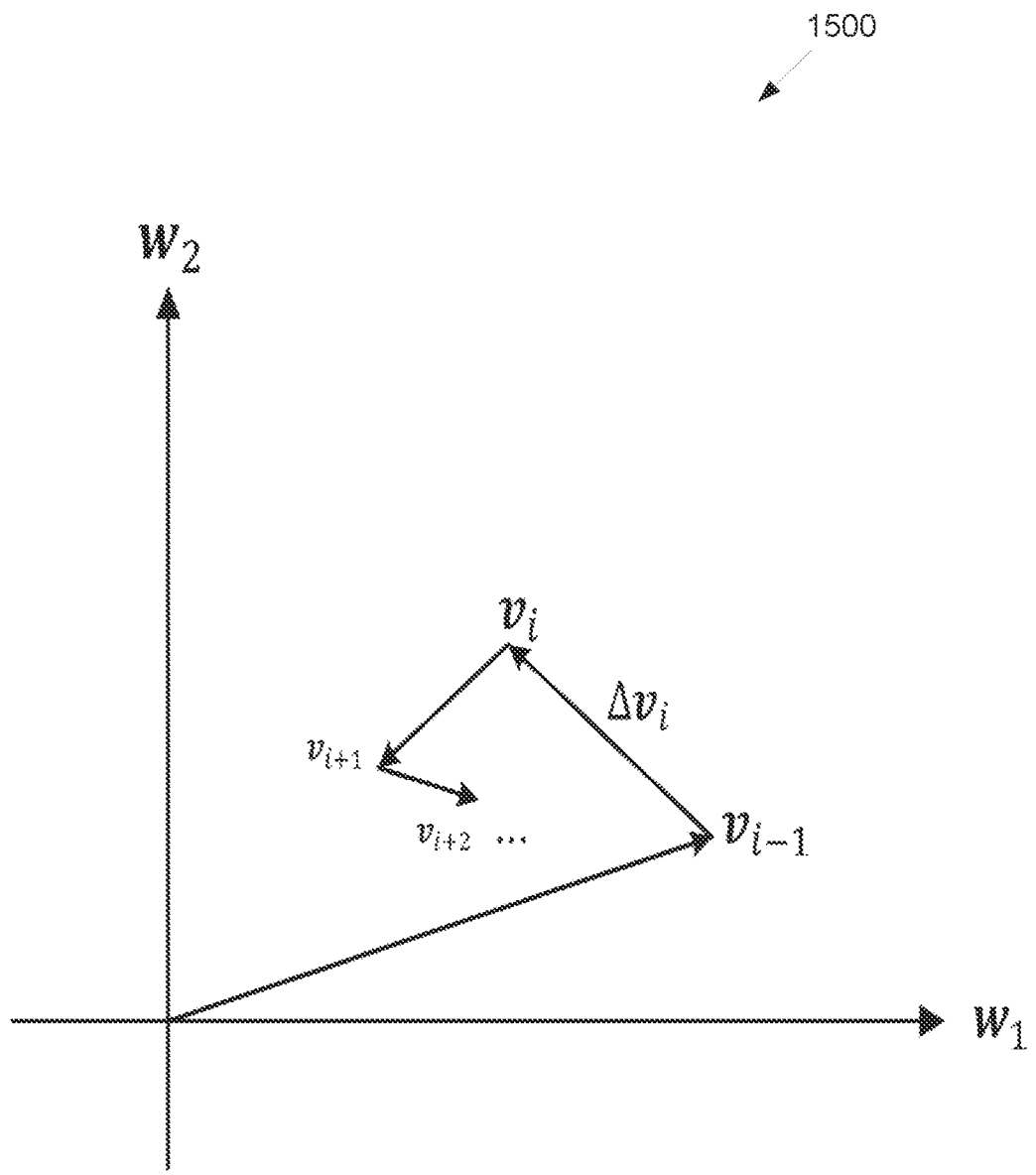
FIG. 15 illustrates an example of adaptive/multi-stage UL precoding using an adaptive/multi-stage codebook mechanism according to embodiments of the present disclosure.

FIG. 15 illustrates an example of adaptive/multi-stage UL precoding using an adaptive/multi-stage codebook mechanism 1500 according to embodiments of the present disclosure. The embodiment of the adaptive/multi-stage UL precoding using an adaptive/multi-stage codebook mechanism 1500 illustrated in FIG. 15 is for illustration only. FIG. 15 does not limit the scope of this disclosure to any particular implementation.

An example of adaptive/multi-stage UL precoding using an adaptive/multi-stage codebook mechanism of $\mathcal{C}(t)=\{\beta \times c_n | c_n \text{ is in } \mathcal{C}(t-1)\}$ with $\beta<1$ is shown in FIG. 15. As shown in FIG. 15, one interesting aspect is that the adaptive/multi-stage UL precoding mechanism can indicate (theoretically) infinite resolution of precoding vector/matrix as time instant passes, by configuring $\beta<1$.

In one example, the NW dynamically/semi-persistently/periodically indicates whether the adaptive/multi-stage codebook mechanism is used or not for the current scheduling time instant. For example, one-bit indicator is used to indicate whether adaptive/multi-stage codebook or original codebook is chosen: for example, '0' refers to a base codebook and '1' refers to adaptive/multi-stage codebook. If a base codebook is indicated, the UE applies amplitudes of B based on the base codebook (a fallback mode, or a retrieving mode). If adaptive/multi-stage codebook is indicated, the UE applies amplitudes of B based on the codebook that is generated from $\beta$ and the previous codebook at the previous scheduling time instant.

In one example, several values of $\beta$ are pre-determined, and one of them is indicated to construct the adaptive/multi-stage codebook with the indicated $\beta$. In one example, $$\beta \in \left\{\frac{1}{\sqrt{2}}, 1\right\}.$$

In another example, $$\beta \in \left\{\frac{1}{2}, \frac{1}{\sqrt{2}}, 1, \sqrt{2}\right\}.$$

Note that $\beta>1$ makes the codebook to be scale up whereas $\beta<1$ makes the codebook to be scaled down.

In one example, the adaptive/multi-stage codebook is independently applied for each column of B. In one example, $\beta$ value is independently chosen for each column of B. In another example, some column(s) is/are selected from a base codebook (a fallback mode or a retrieving mode), the other columns are selected from adaptive/multi-stage codebooks.

In one example, a mixture of adaptive/multi-stage codebooks in the examples above is used to indicate amplitudes for each column of B. For example, adaptive/multi-stage codebooks are designed based on $\mathcal{C}_1 = \mathcal{C}(t)$.

Figure 16:
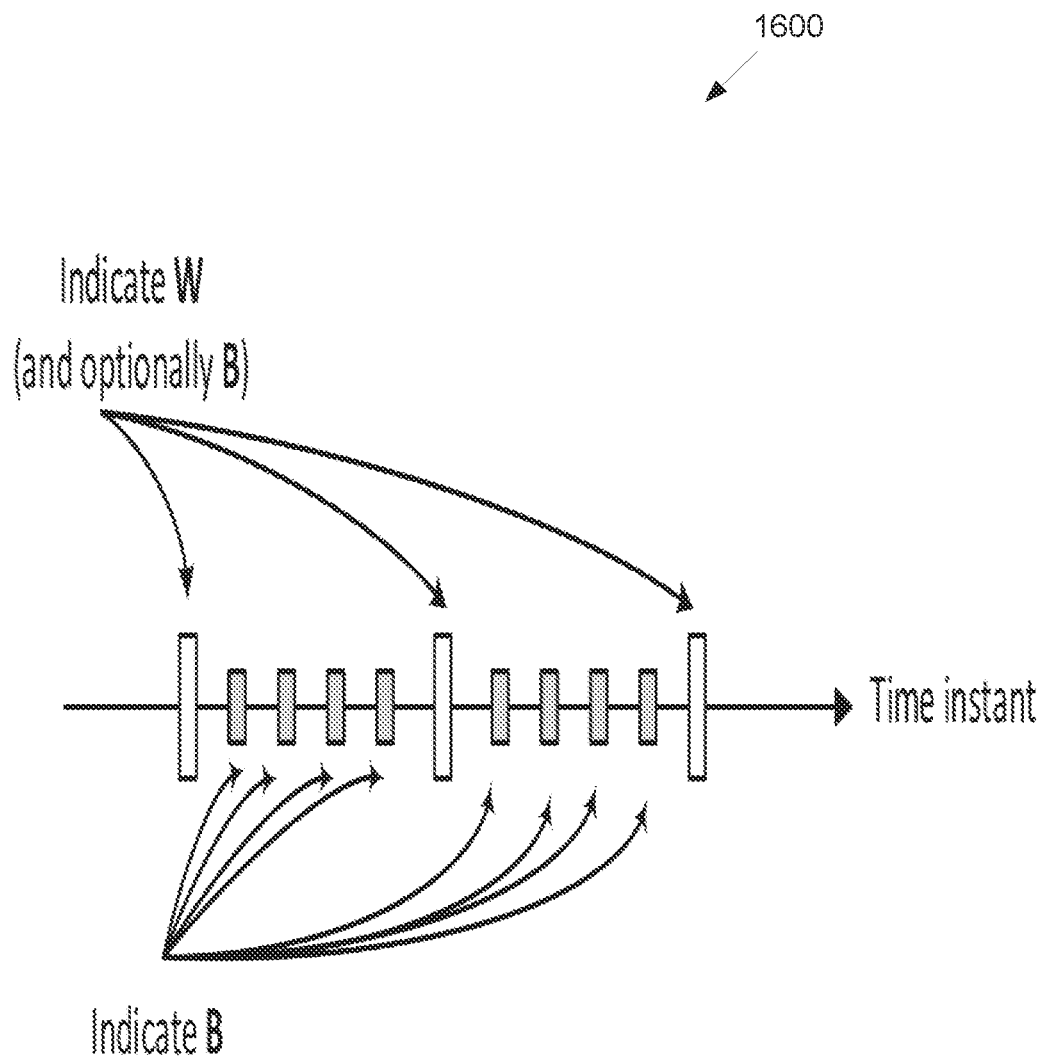
FIG. 16 illustrates an example of two-level indication for W and B with different/independent periodicity according to embodiments of the present disclosure.

FIG. 16 illustrates an example of two-level indication for W and B with different/independent periodicity 1600 according to embodiments of the present disclosure. The embodiment of the two-level indication for W and B with different/independent periodicity 1600 is for illustration only. FIG. 16 does not limit the scope of this disclosure to any particular implementation.

In one embodiment, a two-level indication is performed. In one example W is updated via MAC-CE/higher-layer parameter or only when an update is needed. B is indicated via DCI/MAC-CE (or higher parameter) and can be updated with more frequency than W updates (e.g., via a shorter periodicity for indication). In this case, for the time instants at which B is only updated without W, UE computes $\Delta V_{WB,i}$ using the updated B and the W that was updated/used at the most recent time instant. An example of two-level indication for W and B with different/independent periodicity is depicted in FIG. 16.

In one embodiment, the elements of B are decomposed into phases (i.e., amplitude or power is not included in B), wherein the phases are determined/configured according to at least one example described above.

In one embodiment, the matrix B is a selection matrix comprising selection vectors as its columns, where a selection vector comprises only one non-zero value (e.g., 1) and remaining zero values. The location (index) of the non-zero value in a selection vector corresponds to a selection of corresponding antenna port at the UE. In case of dual-polarized antenna ports the UE, the selection can be polarization-common (both polarizations of a selected antennae are selected) or polarization-independent.

In one embodiment, a UE is configured/indicated to perform adaptive/multi-stage UL precoding for a subset of antenna ports $S$ and to perform non-adaptive UL precoding for the remaining antenna ports $S^c$. In one example, the UL precoding matrix V can be decomposed into $v(S)$ and $v(S^c)$, where $v(S)$ and $v(S^c)$ are matrices composed of rows of v corresponding to $S$ and $S^c$, respectively. In one example, $V(S)$ is updated based on (1) with the relevant embodiments in this disclosure and $V(S^c)$ is not updated based on (1) but selected from codebook(s) for the base UL precoding.

In one embodiment, a UE is equipped with partial coherent antenna port groups and UL precoding matrices for partial coherent antenna port groups can be determined/indicated according to at least one of the following examples.

In one example, the UL precoding matrix corresponding to each group performs adaptive/multi-stage UL precoding based on (1).

In one example, the UL precoding matrix corresponding to each of some groups performs adaptive/multi-stage UL precoding based on (1). In one example, some groups can be fixed or configured.

In one example, the UL precoding matrix corresponding to each group performs adaptive/multi-stage UL precoding based on (1), in a cycling manner. In this case, for example, the UL precoding matrix corresponding to a first group performs (1) firstly, the UL precoding matrix corresponding to a second group performs (1) secondly, . . . the UL precoding matrix corresponding to a last group performs (1) lastly in the first cycle, . . . , the UL precoding matrix corresponding to a first group performs (1) firstly in the second cycle, . . . and so on.

In one example, the UL precoding matrix corresponding to each of some groups performs adaptive/multi-stage UL precoding based on (1), in a cycling manner. This example is similar to the above example, except that some groups to be performed in a cycling adaptive/multi-stage UL precoding process are fixed or configured.

When performing adaptive/multi-stage UL precoding in (1) in the above examples, other relevant embodiments to (1) in this disclosure can be applied.

In one embodiment, the adaptive/multi-stage UL precoding process can be extended/applied to cases where frequency selective (SB) UL precoding matrices are supported. In one example, the WB precoding matrix is selected from codebook(s) for the base UL precoding, and SB precoding matrices are computed based on (1). For example, in this case, (1) can be regarded as $V_{SB,i} = V_{SB,i-1} + \Delta V_{SB,i}$ where $V_{SB,0} = V_{WB}$ is the WB precoding matrix, and $V_{,i}$ is the i-th SB UL precoding matrix for i=1, 2, ....

In one embodiment, the adaptive/multi-stage UL precoding process can be performed via different signaling mediums (e.g., RRC, MAC-CE, DCI). In one example, the base precoding matrix can be indicated/configured via RRC, and update precoding matrix can be configured/indicated via MAC-CE/DCI. In one example, in this case, $V_{WB,0}$ is indicated/configured via RRC, and $\Delta V_{WB,i}$ is indicated/configured via MAC-CE/DCI, so the adaptive/multi-stage UL precoding matrix can be updated via MAC-CE/DCI with (1) once the base UL precoding is indicated/configured.

Any of the above variation embodiments can be utilized independently or in combination with at least one other variation embodiment.

Figure 17:
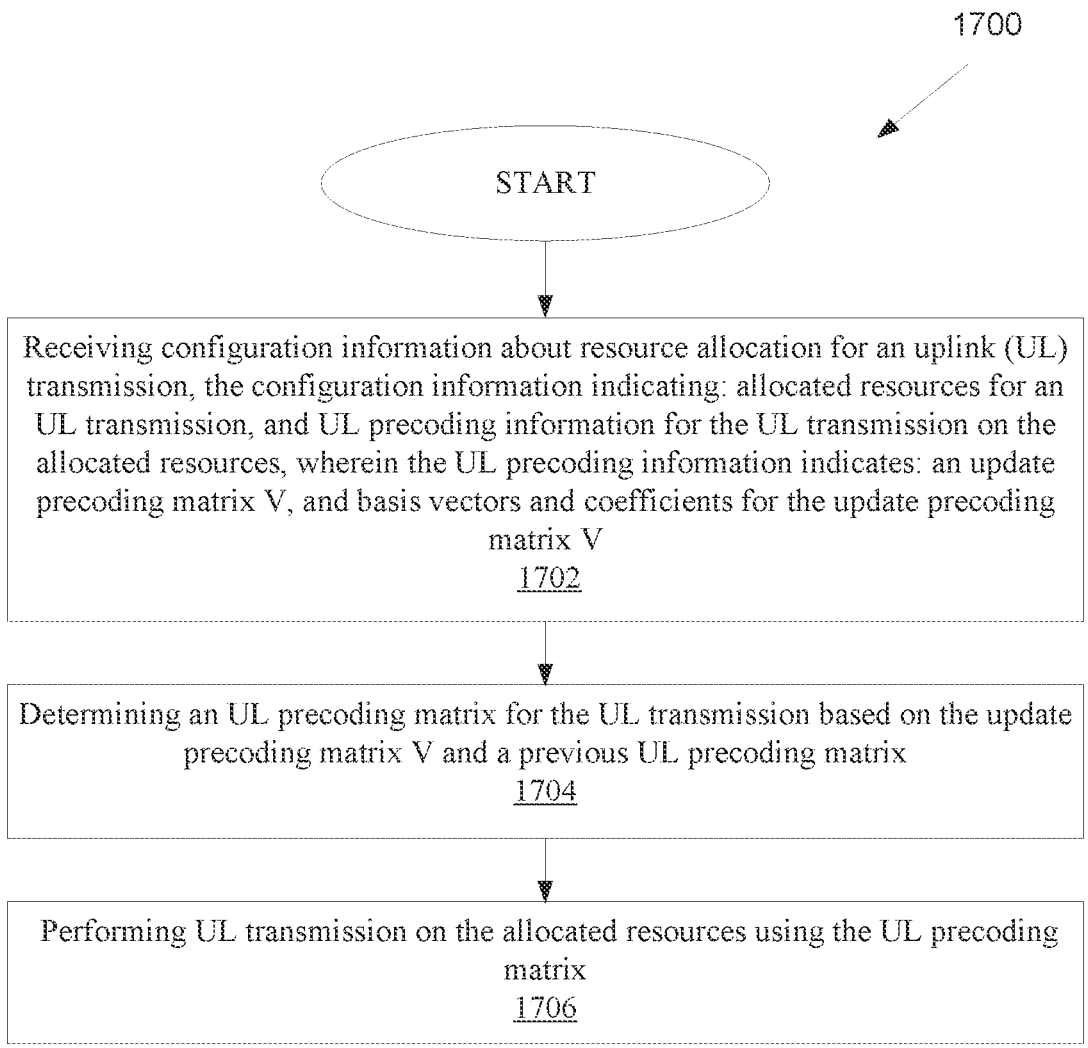
FIG. 17 illustrates a flow chart of a method for operating a UE according to embodiments of the present disclosure.

FIG. 17 illustrates a flow chart of a method 1700 for operating a UE, as may be performed by a UE such as UE 116, according to embodiments of the present disclosure. The embodiment of the method 1700 illustrated in FIG. 17 is for illustration only. FIG. 17 does not limit the scope of this disclosure to any particular implementation.

As illustrated in FIG. 17, the method 1700 begins at step 1702. In step 1702, the UE (e.g., 111-116 as illustrated in FIG. 1) receives configuration information about resource allocation for an uplink (UL) transmission, the configuration information indicating: allocated resources for an UL transmission, and UL precoding information for the UL transmission on the allocated resources, wherein the UL precoding information indicates: an update precoding matrix V, and basis vectors and coefficients for the update precoding matrix V.

In step 1704, the UE determines an UL precoding matrix for the UL transmission based on the update precoding matrix V and a previous UL precoding matrix.

In step 1706, the UE performs UL transmission on the allocated resources using the UL precoding matrix.

In one embodiment, the basis vectors are indicated using a set of oversampled discrete Fourier transform (DFT) vectors, and the coefficients for the basis vectors are indicated using a phase codebook and an amplitude codebook.

In one embodiment, a first granularity of the amplitude codebook is determined by a scaling factor $\beta$ and a second granularity of a second amplitude codebook, wherein the second amplitude codebook is an amplitude codebook used in a previous uplink transmission.

In one embodiment, the scaling factor $\beta$ is fixed to $$\frac{1}{\sqrt{2}}$$

or indicated using a set of $$\left\{\frac{1}{2}, \frac{1}{\sqrt{2}}, 1, \sqrt{2}\right\}.$$

In one embodiment, the previous UL precoding matrix is an UL precoding matrix applied for a previous uplink transmission.

In one embodiment, the configuration information includes a fall back mode.

In one embodiment, when the configuration information includes the fall back mode, the UL precoding matrix is determined based only on the update precoding matrix V.

Figure 18:
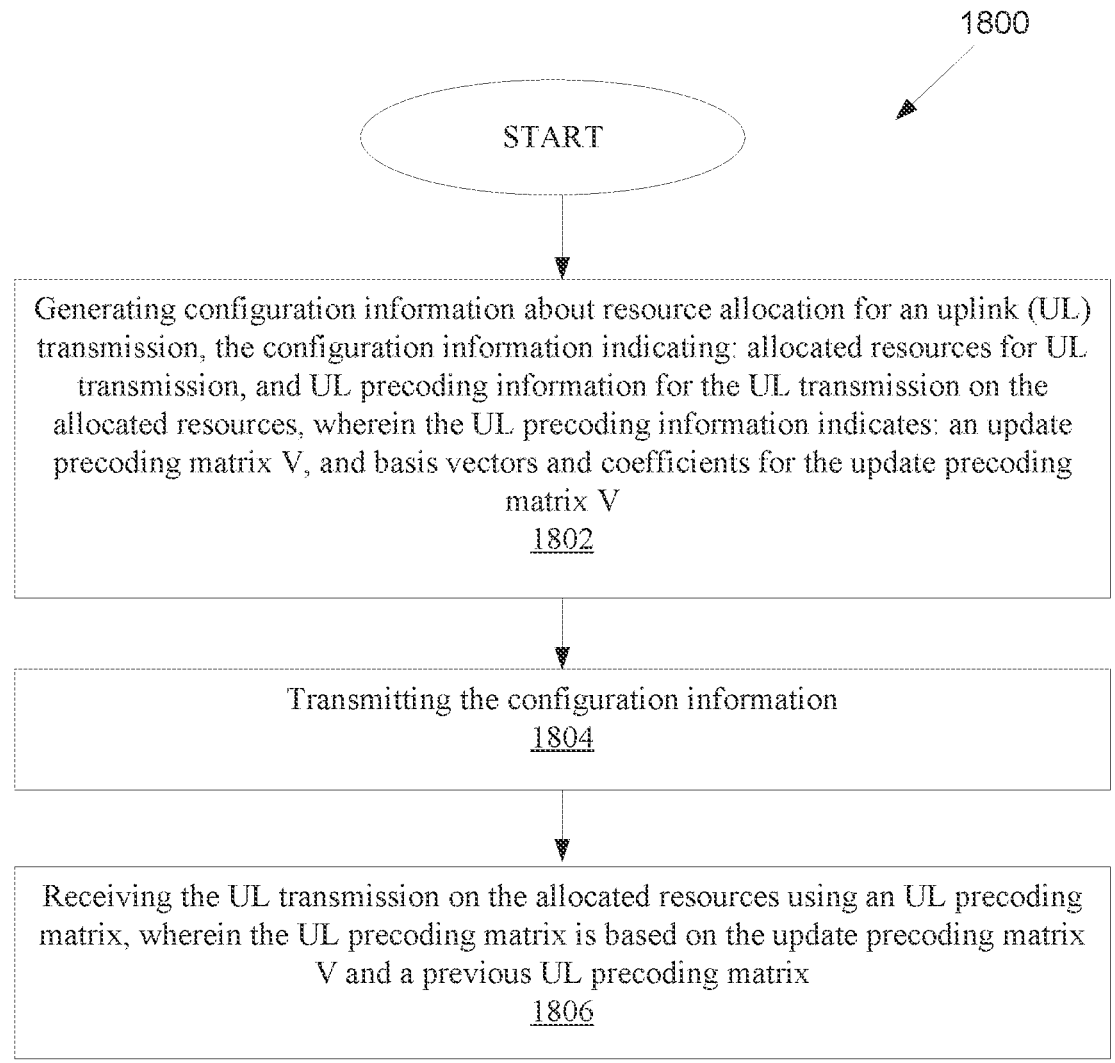
FIG. 18 illustrates a flow chart of a method for operating a BS according to embodiments of the present disclosure.

FIG. 18 illustrates a flow chart of another method 1800, as may be performed by a base station (BS) such as BS 102, according to embodiments of the present disclosure. The embodiment of the method 1800 illustrated in FIG. 18 is for illustration only. FIG. 18 does not limit the scope of this disclosure to any particular implementation.

As illustrated in FIG. 18, the method 1800 begins at step 1802. In step 1802, the BS (e.g., 101-103 as illustrated in FIG. 1), generates configuration information about resource allocation for an uplink (UL) transmission, the configuration information indicating: allocated resources for UL transmission, and UL precoding information for the UL transmission on the allocated resources, wherein the UL precoding information indicates: an update precoding matrix V, and basis vectors and coefficients for the update precoding matrix V.

In step 1804, the BS transmits the configuration information.

In step 1806, the BS receives the UL transmission on the allocated resources using an UL precoding matrix, wherein the UL precoding matrix is based on the update precoding matrix V and a previous UL precoding matrix.

In one embodiment, the basis vectors are indicated using a set of oversampled discrete Fourier transform (DFT) vectors, and the coefficients for the basis vectors are indicated using a phase codebook and an amplitude codebook.

In one embodiment, a first granularity of the amplitude codebook is determined by a scaling factor $\beta$ and a second granularity of a second amplitude codebook, wherein the second amplitude codebook is an amplitude codebook used in a previous uplink transmission.

In one embodiment, the scaling factor $\beta$ is fixed to $$\frac{1}{\sqrt{2}}$$

or indicated using a set of $$\left\{\frac{1}{2}, \frac{1}{\sqrt{2}}, 1, \sqrt{2}\right\}.$$

In one embodiment, the previous UL precoding matrix is an UL precoding matrix applied for a previous uplink transmission.

In one embodiment, the configuration information includes a fall back mode.

In one embodiment, when the configuration information includes the fall back mode, the UL precoding matrix is determined based only on the update precoding matrix V.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive configuration information associated with resource allocation for an uplink (UL) transmission, the configuration information indicating:
allocated resources for the UL transmission, and
UL precoding information for the UL transmission on the allocated resources, wherein the UL precoding information indicates:
an update precoding matrix V, and
basis vectors and coefficients for the update precoding matrix V; and
a processor operably coupled to the transceiver, the processor configured, based on the update precoding matrix V and a previous UL precoding matrix, to determine an UL precoding matrix for the UL transmission,
wherein the transceiver is further configured to perform the UL transmission on the allocated resources using the UL precoding matrix,
wherein coefficients for the basis vectors are indicated using a phase codebook and an amplitude codebook, and
wherein a first granularity of the amplitude codebook is determined by (i) a scaling factor $\beta$ and (ii) a second granularity of a second amplitude codebook.

2. The UE of claim 1, wherein the basis vectors are indicated using a set of oversampled discrete Fourier transform (DFT) vectors.

3. The UE of claim 2, wherein the second amplitude codebook is an amplitude codebook used in a previous uplink transmission.

4. The UE of claim 3, wherein the scaling factor $\beta$ is fixed to $$\frac{1}{\sqrt{2}}$$

or indicated using a set of $$\left\{\frac{1}{2}, \frac{1}{\sqrt{2}}, 1, \sqrt{2}\right\}.$$

5. The UE of claim 1, wherein the previous UL precoding matrix is an UL precoding matrix applied for a previous uplink transmission.

6. The UE of claim 1, wherein the configuration information indicates a fall back mode.

7. The UE of claim 1, wherein, when the configuration information indicates a fall back mode, the UL precoding matrix is determined based only on the update precoding matrix V.

8. A base station (BS) comprising:
a processor configured to generate configuration information associated with resource allocation for an uplink (UL) transmission, the configuration information indicating:
allocated resources for the UL transmission, and
UL precoding information for the UL transmission on the allocated resources, wherein the UL precoding information indicates:
an update precoding matrix V, and
basis vectors and coefficients for the update precoding matrix V; and
a transceiver operably coupled to the processor, the transceiver configured to:
transmit the configuration information; and
receive the UL transmission on the allocated resources using an UL precoding matrix, wherein the UL precoding matrix is based on the update precoding matrix V and a previous UL precoding matrix,
wherein coefficients for the basis vectors are indicated using a phase codebook and an amplitude codebook, and
wherein a first granularity of the amplitude codebook is determined by (i) a scaling factor $\beta$ and (ii) a second granularity of a second amplitude codebook.

9. The BS of claim 8, wherein the basis vectors are indicated using a set of oversampled discrete Fourier transform (DFT) vectors.

10. The BS of claim 9, wherein the second amplitude codebook is an amplitude codebook used in a previous uplink transmission.

11. The BS of claim 10, wherein the scaling factor $\beta$ is fixed to $$\frac{1}{\sqrt{2}}$$

or indicated using a set of $$\left\{\frac{1}{2}, \frac{1}{\sqrt{2}}, 1, \sqrt{2}\right\}.$$

12. The BS of claim 8, wherein the previous UL precoding matrix is an UL precoding matrix applied for a previous uplink transmission.

13. The BS of claim 8, wherein the configuration information indicates a fall back mode.

14. The BS of claim 8, wherein, when the configuration information indicates a fall back mode, the UL precoding matrix is determined based only on the update precoding matrix V.

15. A method for operating a user equipment (UE), the method comprising:

receiving configuration information associated with resource allocation for an uplink (UL) transmission, the configuration information indicating:
allocated resources for the UL transmission, and
UL precoding information for the UL transmission on the allocated resources, wherein the UL precoding information indicates:
an update precoding matrix V, and
basis vectors and coefficients for the update precoding matrix V;
determining an UL precoding matrix for the UL transmission based on the update precoding matrix V and a previous UL precoding matrix;
performing the UL transmission on the allocated resources using the UL precoding matrix;
indicating the coefficients for the basis vectors using a phase codebook and an amplitude codebook; and
determining a first granularity of the amplitude codebook by a scaling factor $\beta$ and a second granularity of a second amplitude codebook.

16. The method of claim 15, wherein the basis vectors are indicated using a set of oversampled discrete Fourier transform (DFT) vectors.

17. The method of claim 16, wherein the second amplitude codebook is an amplitude codebook used in a previous uplink transmission.

18. The method of claim 17, wherein the scaling factor $\beta$ is fixed to $$\frac{1}{\sqrt{2}}$$

or indicated using a set of $$\left\{\frac{1}{2}, \frac{1}{\sqrt{2}}, 1, \sqrt{2}\right\}.$$

19. The method of claim 15, wherein the previous UL precoding matrix is an UL precoding matrix applied for a previous uplink transmission.

20. The method of claim 15, wherein the configuration information indicates a fall back mode, the method further comprising determining the UL precoding matrix based only on the update precoding matrix V.

* * * * *